United States Patent
Sekiguchi et al.

(10) Patent No.: US 6,577,361 B1
(45) Date of Patent: Jun. 10, 2003

(54) LIQUID CRYSTAL DISPLAY

(75) Inventors: Kanetaka Sekiguchi, Sayama (JP); Takashi Akiyama, Sayama (JP)

(73) Assignee: Citizen Watch Co., Ltd., Tokyo (JP)

(*) Notice: Subject to any disclaimer, the term of this patent is extended or adjusted under 35 U.S.C. 154(b) by 0 days.

(21) Appl. No.: 09/856,490

(22) PCT Filed: Dec. 9, 1999

(86) PCT No.: PCT/JP99/06914

§ 371 (c)(1), (2), (4) Date: Jun. 11, 2001

(87) PCT Pub. No.: WO00/34821

PCT Pub. Date: Jun. 15, 2000

(30) Foreign Application Priority Data

Dec. 9, 1998 (JP) ............................................ 10-349448

(51) Int. Cl.[7] ............................................. G02F 1/1335
(52) U.S. Cl. ............................................. 349/96; 349/68
(58) Field of Search ........................... 349/68, 96, 105, 349/115, 117

(56) References Cited

FOREIGN PATENT DOCUMENTS

| | | |
|---|---|---|
| EP | 0 864 905 | 9/1998 |
| JP | 4-218025 | 8/1992 |
| JP | 7-181476 | 7/1995 |
| JP | 8-76113 | 3/1996 |
| JP | 9-258013 | 10/1997 |
| JP | 10-133196 | 5/1998 |
| JP | 10-170916 | 6/1998 |
| JP | 10-260402 | 9/1998 |
| JP | 10-268301 | 10/1998 |
| JP | 11-64631 | 3/1999 |
| JP | 11-142646 | 5/1999 |
| WO | WO 97/01788 | 1/1997 |
| WO | WO 98/43225 | 10/1998 |

*Primary Examiner*—Toan Ton
*Assistant Examiner*—Hoan Nguyen
(74) *Attorney, Agent, or Firm*—Armstrong, Westerman & Hattori, LLP.

(57) ABSTRACT

A first polarizer (absorption-type polarizer) (21) is disposed in a visible side of a liquid crystal cell (1) in which a liquid crystal layer (15) is sealed in-between a pair of transparent substrates (2, 5), and a second polarizer (reflection-type polarizer) (22), a third polarizer (an absorption-type polarizer or a reflection-type polarizer) (25), and an auxiliary light source (31) are disposed in order in the opposite side to the visible side and by polarizing emitted light from the auxiliary light source 31 by the third polarizer (25) and the second polarizer (22), polarization degree of light emitted from the second polarizer (22) into the liquid crystal cell (1) is improved, thereby unevenness of display caused by lack of the polarization degree and distribution of the polarization degree of the second polarizer (22) and contrast ratio are improved.

20 Claims, 12 Drawing Sheets

OFFSET ANGLES θ (DEGREES) BETWEEN TRANSMISSION AXES OF
THE SECOND POLARIZER AND THE THIRD POLARIZER

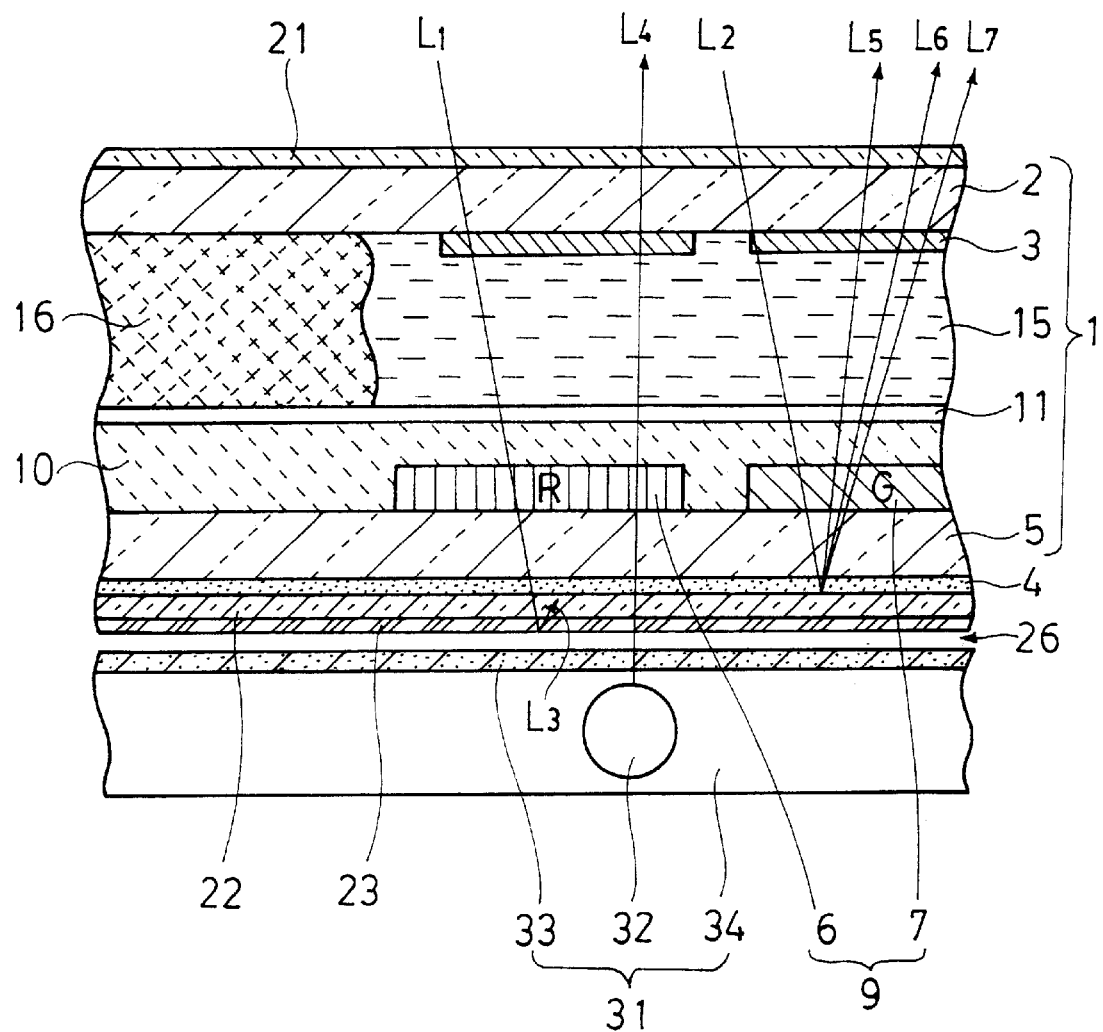

LIQUID CRYSTAL DISPLAY

TECHNICAL FIELD

The present invention relates to a liquid crystal display device having a liquid crystal display panel composed of a liquid crystal cell which seals a liquid crystal layer between a pair of transparent substrates giving optical change to incident light by applying voltage to the liquid crystal layer and polarizers provided in a visible side of the liquid crystal cell and the opposite side thereof respectively, and an auxiliary light source provided in an opposite side with respect to the visible side. Namely, it relates to a transmissive liquid crystal display device and a transflective liquid crystal display device.

BACKGROUND TECHNOLOGY

Currently, among the liquid crystal display devices, there exist a transmissive liquid crystal display device which performs a display by lighting at an auxiliary light source provided therein all times, a reflective liquid crystal display device which performs a display utilizing light from an external light source (sunlight or illumination light source), and a transflective liquid crystal display device which performs a display utilizing reflecting light obtained from the external light source when the external light is bright, and performs the display utilizing transmission light obtained from a lighted inner auxiliary light source when the external light is dark.

The reflective liquid crystal display device is most effective to make the best use of the merit of low power consumption and thinness of a liquid crystal display device. However, since it can not perform display when external surroundings are dark, a transflective liquid crystal display device is widely used, which can perform display even if the external surroundings are dark by providing an auxiliary light source inside thereof.

An example of structure and function of a conventional transflective liquid crystal display device will be explained with FIG. 17 and FIG. 18. FIG. 17 is a plan view of a conventional transflective liquid crystal display device, and FIG. 18 is a schematic enlarged sectional view taken along the line 18—18 in FIG. 17. In FIG. 17, since most constituting members are transparent and a lower side member among members overlapping vertically, each other can be seen through, such a lower side member is also shown with solid lines. In the following explanation, a visible side which can be recognized by observers is taken as an upper side In the above transflective liquid crystal display device, a liquid crystal cell (optical adjuster) 1 is composed such that a first substrate 2 and a second substrate 5 both made of a transparent material such as glass are opposedly disposed with a predetermined space and coupled to each other with a sealing member 16 to seal a liquid crystal layer 15 in-between thereof so that an optical change can be given to incident light by applying voltage on the liquid crystal layer 15.

The transflective liquid crystal display device comprises a first polarizer (polarized light separator) 21 provided on the outside (the upper side in FIG. 18) of the first substrate 2 which is in the visible side of the liquid crystal cell 1, and a second polarizer (polarized light separator) 22 provided on the outside (the lower side in FIG. 18) of the second substrate 5 which is on the opposite side with respect to the visible side, respectively, and an auxiliary light source 31 is provided on the opposite side of the second polarizer 22 with respect to the liquid crystal cell 1.

Further explaining the liquid crystal cell 1 in detail, as shown in FIG. 17, on the inner surface of the first substrate 2, stripe-shaped signal electrodes 3 made of an indium tin oxide (ITO) film which is a transparent conductive film are formed in a lateral direction with a predetermined space.

On the inner surface of the second substrate 5, a color filter 9 composed of red (R) color filters 6, green (G) color filters 7 and blue (B) color filters (not shown) is provided first, and a protective insulating film 10 is disposed thereon, then stripe-shaped scanning electrodes 11 made of ITO film are formed in a longitudinal direction with a predetermined space on the protective insulating film 10, as shown in FIG. 17.

The color filter 9 is formed in a state that the adjacent color filters having a color different from each other are overlapped slightly or abutted on each other. The protective insulating film 10 is provided to flatten the difference in level of the color filter 9 and to prevent deterioration of the signal electrodes 3 caused during the pattern forming process.

As shown in FIG. 17, an intersection point of the signal electrode 3 and the scanning electrode 11 intersecting to each other at right angles serves as a pixel portion 14, and a display region is formed with a number of the pixel portions 14 provided in a matrix.

Alignment layers (not shown) as treatment layers to align the liquid crystal layer 15 in a predetermined direction are provided respectively on the opposing surfaces of the first substrate 2 and the second substrate 5.

The first substrate 2 and the second substrate 5 are coupled with a fixed space therebetween with the sealing member 16 in a manner that the signal electrodes 3 on the first substrate 2 face the scanning electrodes 11 on the second substrate 5, and the liquid crystal layer 15 is filled through the opening provided in the sealing member 16, and then hermetically closed with a sealant 17 shown in FIG. 17.

Though a twisted nematic (TN) liquid crystal, a super twisted nematic (STN) liquid crystal, or a homeotropic liquid crystal are used for the liquid crystal layer 15, a twisted nematic (TN) liquid crystal having a twist angle of 90° is assumed to be used in this explanation.

A first polarizer 21 provided on the upper side of the first substrate 2 in the liquid crystal cell 1 is an absorption-type polarizer (absorptive polarized light separator) in which one polarization axis is a transmission axis and another polarization axis intersecting with the transmission axis at nearly right angles is an absorption axis, and a second polarizer 22 provided on the bottom side of the second substrate 5 is a reflection-type polarizer (reflective polarized light separator) in which one polarization axis is a transmission axis and another polarization axis intersecting with the transmission axis at nearly right angles is a reflection axis. The first polarizer 21 and the second polarizer 22 are disposed in such a manner that both transmission axes intersect with each other at right angles.

A scattering layer 4 made of a mixture of transparent resin and polyvinyl resin beads having different refractive indices is provided between the second polarizer 22 and the second substrate 5, and a printed layer 23 made of translucent ink is further provided on the bottom surface of the second polarizer 22.

According to a ratio of absorption to transmission of the printed layer 23, brightness in a dark display state at the time of reflective display and in a bright display state at the time of transmissive display is determined.

The auxiliary light source 31 is disposed in further lower side of the second polarizer 22, which is composed of a fluorescent tube 32, a reflector 34, a diffuser 33 and a prism sheet (not shown) in this example.

In the transflective liquid crystal display device thus structured, as shown in FIG. 18, when an external light from a main light source, for instance sunlight, passes through the first polarizer 21 and the first substrate 2 of the liquid crystal cell 1, as a first incident light L1, and when made incident on a portion of the liquid crystal layer 15 in which no voltage is applied (background portion), the first incident light L1 is made incident on a color filter 9 while being optically rotated or being given a phase difference by the liquid crystal layer 15, passes through the second substrate 5 and the scattering layer 4 and comes to the second polarizer.

The first incident light L1 passes through the above described light course, which causes absorption by respective members, light attenuation arises when it becomes an incident light into the second polarizer 22.

A linearly polarized light component of the first incident light L1 passed through the first polarizer 21 is optically rotated at an angle of 90° by the liquid crystal layer 15, made incident on the second polarizer 22 in a direction parallel to the transmission axis thereof and passes therethrough. However, absorption occurs due to the printed layer 23 disposed on the bottom surface of the second polarizer 22, so that a first reflected light L3 reflected by the printed layer 23 becomes very weak in intensity and hardly emitted to the observer's side.

A second incident light L2 from the external light source also reaches the second polarizer 22 after passing through the same course as in the case of the first incident light L1, it passes through a portion in which voltage is applied on the liquid crystal layer 15 (display portion) by the signal electrodes 3 and the scanning electrodes 15 in the liquid crystal cell 1 into the second polarizer 22.

In this case, a linearly polarized light component of the second incident light L2 passed through the first polarizer 21 is made incident on the second polarizer 22 without being optically rotated at an angle of 90° when it passes through the liquid crystal cell 15. Accordingly, since the incident light becomes a light linearly polarized in a direction parallel to the reflection axis of the second polarizer which is a reflection-type polarizer, all the incident light are reflected by the second polarizer 22. Then scattering property is given by the scattering layer 4 and it becomes a second reflection light L5, a third reflection light L6, a fourth reflection light L7 and so on which respectively pass through the color filters 9 to be emitted into the observer's side.

Therefore, a color display in bright can be visually recognized in a dark background.

When a fluorescent tube 32 of an auxiliary light source 31 is on, the emitted light L4 from the auxiliary light source 31 are partially absorbed by the printed layer 23, a linearly polarized light component polarized in a direction parallel to the transmission axis of the second polarizer 22 passes through the second polarizer 22, then passes through the color filters 9 of the liquid crystal cell 1 after scattering property being given by the scattering layer 4, and is made incident on the liquid crystal layer 15.

When the incident light passes through a portion of the liquid crystal layer 15 in which no voltage is applied (background portion), since the linearly polarized light is optically rotated at an angle of 90°, and made incident on the first polarizer 21 as a light linearly polarized in a direction parallel to the transmission axis thereof, the incident light is emitted into the observer's side after passing through the first polarizer 21. However, when the incident light passes through a portion of the liquid crystal layer 15 in which voltage is applied (display portion), the linearly polarized light is not optically rotated at an angle of 90° and is made incident on the first polarizer 21 which is an absorption-type polarizer, as a light linearly polarized in a direction parallel to the absorption axis thereof, thereby the incident light being absorbed by the first polarizer 21, and hardly emitted into the observer's side.

Therefore, a display in a dark color (black) can be visually recognized in a bright background.

In the transflective liquid crystal display device described above, in a case of a display using an external light source, the use of a reflection-type polarizer as the second polarizer 22 has the following advantages compared with a case of using a combination of an absorption-type polarizer and a transflective reflector.

When an absorption-type polarizer is used, since a bright display utilizes light reflected by a transflective reflector disposed in the bottom side of the absorption-type polarizer, the light passes through the absorption-type polarizer twice, which increases attenuation due to the absorption of the light.

Furthermore, the reflection intensity is lowered because the transflective reflector has a transmission property. In other words, the more the reflection property is enhanced, the lower the transmission property becomes, or the more the transmission property is enhanced, the lower the reflection property becomes. Because of these, the quantity of light emitted into the observer's side is decreased, and brightness of the display is lowered.

When a reflection-type polarizer is used, on the contrary, since a bright display is achieved by reflection in a reflection axis of the reflection-type polarizer and scattering property of the scattering layer 4 provided between the reflection-type polarizer and the second substrate 5, light attenuation can be reduced. The transmission property is also maintained by means of the polarization axis (transmission axis). Therefore a bright display in a light state can be realized.

A case of a dark display will be explained next. In a case of using an absorption-type polarizer and a transflective reflector as the second polarizer 22, when a linearly polarized light component polarized in a direction parallel to the absorption axis is made incident on the absorption-type polarizer, the light is absorbed and does not reach the transflective reflector, which makes the display dark, because the reflection property of the absorption-type polarizer is weak.

In a case of using a reflection-type polarizer, when a light linearly polarized in a direction parallel to the transmission axis is made incident on the reflection-type polarizer, the light passes through the reflection-type polarizer and is absorbed by the printed layer 23, which makes the light reflected into the observer's side from the reflection-type polarizer weak, thereby obtaining a dark display.

Thus, when a transflective liquid crystal display device is used as a reflective liquid crystal display device utilizing external light source, the contrast ratio is about 10 to 1 due to the adoption of design which regards brightness as important because the visibility is lowered in a dark display, and due to expectation of reflection of the external light and reflecting-in of the outside surroundings on the surface of the liquid crystal display panel. Therefore it is possible to use satisfactorily even the polarization degree of the second polarizer is low (for instance, even as low as a level of 92%).

In addition, even when the polarization degree of the reflection-type polarizer, especially the polarization degree of the reflection axis, is partially changed, it presents no problem because of lowness of the contrast and the brightness, and weakness in observer's sensitivity to the difference in brightness because of using it for a bright display.

Furthermore, if the polarization degree of the reflection axis of the reflection-type polarizer has a wavelength dependency in the visible light region, and the reflection-type polarizer has an insufficient portion in polarization degree, it presents little problem because of the weakness in sensitivity of the observer.

However, when the transflective liquid crystal display device is used as a transmissive liquid crystal display device by lighting the auxiliary light source 31 disposed on the bottom side of the second polarizer 22 shown in FIG. 18, since the contrast ratio is increased, though depending on the intensity of the light source, and since the reflection axis of the reflection-type polarizer serves to block the light, it becomes a dark display.

Accordingly, only a slight difference in contrast, or a slight difference in color can be recognized by observers. Additionally, in a case of the transflective liquid crystal display, since an auxiliary light source is used in a dark surroundings, the observer's sensitivity increases against unevenness of the dark display and coloring thereof, so that a slight unevenness in display results in the recognition by observers.

In a case of a transflective liquid crystal display device having color filters, color filters having high transmittance are used to obtain a display as bright as possible when used as a reflective one.

As a result, even when an auxiliary light source having a weak light emitting intensity compared with that in the transmissive liquid crystal display device is used to reduce power consumption, it becomes a comparatively bright display. Consequently, positional distribution of the polarization degree of the second polarizer 22 can be recognized by the observers as the distribution of the contrast ratio.

Further, the difference in the polarization degree depending on wavelength in the visible light region causes coloring of the dark display.

As a countermeasure against this, the difference in the contrast ratio and difference in color can be reduced to the extent almost not recognizable by arranging the polarization degree of the second polarizer 22 to be about 99.9% so that the difference in the polarization degree is about 1%, but there is a limit in the polarization degree so far as using a thin and inexpensive reflection-type polarizer.

The present invention is achieved in view of the above-described disadvantages when using a conventional transflective liquid crystal display device as a transmissive liquid crystal display device by lighting an auxiliary light source, and the object thereof is to provide a thin and inexpensive liquid crystal display device without impairment of portability, in which a display quality in a reflection display and transmission display of a transflective liquid crystal display device is improved and in particular, reduction of unevenness of the display and unevenness in coloring in a case of the transmission display can be realized.

DISCLOSURE OF THE INVENTION

The present invention relates to a liquid crystal display device comprising a liquid crystal cell formed by oppositely disposing a transparent first substrate and a transparent second substrate with a predetermined space, filling a liquid crystal layer in-between thereof so that an optical change is given to incident light by applying voltage on the liquid crystal layer, a first polarizer provided on the outside of the first substrate which is in the visible side of the liquid crystal cell, a second polarizer provided on the outside of the second substrate which is in the opposite side to the visible side of the liquid crystal cell, and an auxiliary light source provided on the opposite side of the second polarizer with respect to the liquid crystal cell. In order to achieve the objects described above, a third polarizer is provided between the second polarizer and the auxiliary light source to enhance the polarization degree when the light from the auxiliary light source is emitted into the liquid crystal cell side as a polarized light after passing through the second polarizer.

The first polarizer is an absorption-type polarizer in which one polarization axis is a transmission axis and another polarization axis intersecting to the transmission axis at nearly right angles is an absorption axis, and the second polarizer is a reflection-type polarizer in which one polarization axis is a transmission axis and another polarization axis intersecting to the transmission axis at nearly right angles is a reflection axis.

A reflection-type polarizer made of a multilayer composed of a plurality of complex layers formed by combining a layer having nearly equal refractive indices in a predetermined direction and in a direction orthogonal thereto and a layer having different refractive indices in a predetermined direction and in the direction orthogonal thereto is used as the reflection-type polarizer.

The third polarizer is an absorption-type polarizer or a reflection-type polarizer.

Further, the first polarizer and the second polarizer are disposed such that the transmission axes thereof intersect at right angles, and the second polarizer and the third polarizer are disposed such that the transmission axes thereof form an angle from 0° to plus or minus 30° (especially, from 0° to plus or minus 10° is preferable).

The third polarizer is preferably composed such that a plurality of either reflection-type polarizer or absorption-type polarizer, or both of them, are piled up.

In such a case, transmission axes of respective polarizers composing the third polarizer are preferably arranged at different directions from each other.

Color filters in plural colors different in transmission intensity in the visible light region may be disposed between the first polarizer and the second polarizer, the auxiliary light source may be made to be a light source emitting light containing transmission wavelengths of the color filters in plural colors, and light emitted from the auxiliary light source may be transmitted through the third polarizer and the second polarizer and transferred to the color filter as a linearly polarized light having little in-plane distribution of polarization degree and little difference of polarization degree in the visible light region.

A scattering layer to scatter light is preferably provided at least on a position in the visible side of the first polarizer, between the first polarizer and the first substrate, or between the first substrate and the second substrate, and the scattering layer is preferably a layer transmitting light with little phase difference between the incident light side and the emitted light side, and without changing the polarization degree.

A light attenuation layer which transmits a part of light and absorbs or diffuses the other light is preferably disposed between the second polarizer and the third polarizer or between the third polarizer and the auxiliary light source.

Further, a retardation film may be provided between the second substrate and the second polarizer or between the second polarizer and the third polarizer.

Furthermore, a minute unevenness (a rough surface) is preferably formed on opposing surfaces of the third polarizer and the auxiliary light source, respectively.

The second polarizer and the third polarizer may be fixed each other with an adhesive layer.

A space is preferably provided between the third polarizer and the auxiliary light source.

A light attenuation layer to increase light absorption or light scattering is preferably provided on a surface of the auxiliary light source facing the third polarizer.

In a case where the third polarizer is a polarizer composed such that a plurality of either reflection-type polarizer or absorption-type polarizer, or both of them, are piled up, either a printed layer which transmits a part of light and absorbs the other light or a space, or both of them, are preferably provided between the plurality of polarizers composing the third polarizer.

In a case where both of the second polarizer and the third polarizer are reflection-type polarizers, the printed layer is preferably provided on a surface of the second polarizer opposing the third polarizer, and a space is preferably provided between the printed layer and the third polarizer. Further, a retardation film is preferably provided between the printed layer and the third polarizer.

The printed layer preferably has no polarization activity and no retardation, and one containing white fluorescent pigment may be used.

The liquid crystal display device according to the present invention (transflective liquid crystal display device) can correct the insufficiency in polarization degree and in-plane unevenness in polarization degree in the visible light region within the second polarizer by the third polarizer, and thereby reduces unevenness in display and unevenness in coloring in the transmission display using an auxiliary light source without increasing the polarization degree of the second polarizer itself, by providing the first polarizer which is an absorption-type polarizer on the visible of the liquid crystal cell and the second polarizer which is a reflection type polarizer on the opposite side of the visible side of the liquid crystal cell such that the transmission axes thereof intersect at right angles, and by further providing the third polarizer between the second polarizer and the auxiliary light source such that the transmission axis thereof is nearly coincide with that of the second polarizer.

In a case of a reflective display, since no absorption occurs in a polarizer compared with the conventional case of using an absorption-type polarizer because of utilizing reflection from the reflection axis of the second polarizer which is a reflection-type polarizer, a display in bright can be realized.

Especially, by using a third polarizer having polarization degree higher than that of a reflection-type polarizer used as the second polarizer, or having a smaller distribution in polarization degree in the visible light region, the polarization degree of light emitted from the second polarizer has no unevenness in the visible light region so that the evenness of display quality of the liquid crystal display device can be extensively improved.

In a case of a liquid crystal display device provided with a color filter, since light emitted from an auxiliary light source contains transmission wavelength of the color filter, wavelength dependency of the second polarizer becomes more remarkable. However, since the wavelength dependency can be reduced by the third polarizer, the evenness of display quality can be extensively improved.

Furthermore, since the polarization degree of the second polarizer can be improved by combining the second polarizer with the third polarizer, the contrast ratio of the display can be improved.

When the liquid crystal display device is used as a reflective display device utilizing an external light source (main light source) with the auxiliary light source being off, since a dark display is performed by utilizing light incident on the transmission axis of the second polarizer, it is necessary to prevent light from reflecting into the observer's side caused by entering the light into the second polarizer again from the bottom side of the second polarizer.

Accordingly, it becomes possible to improve the quality and increase the contrast ratio in a dark display when using as a reflective display by providing a light attenuation layer to reduce reflection of light from the external light source into the second polarizer by transmitting the light partially and absorbing or scattering the rest of the light, between the second polarizer and the third polarizer, or between the third polarizer and the auxiliary light source.

Besides, since there is no need of considering deterioration of the polarization degree due to the light attenuation layer in a case the light attenuation layer being provided between the third polarizer and the auxiliary light source, selection of material for the light attenuation layer is facilitated and further in a case of a transmissive display, lowering in the polarization degree of the third polarizer and the second polarizer can be prevented. A printed layer is an example of the light attenuation layer.

In addition, by using an absorption-type polarizer or a reflection-type polarizer as the third polarizer, it becomes possible to improve the polarization degree of the second polarizer easily in a thin-type device. Especially, in order to improve the polarization degree and to reduce cost, it is efficient to utilize an absorption-type polarizer.

In a case of using a light attenuation layer, it becomes a dark display due to light absorption or scattering in the light attenuation layer. Further, since it transmits a portion of light, in-plane unevenness in transmittance is apt to arise, which makes it difficult to ensure the evenness of the display.

Accordingly, it is necessary to have an offset angle between the transmission axis of the second polarizer and the transmission axis of the third polarizer in a range of 0° to plus or minus 30°.

The polarization degree of light from the auxiliary light source after passing through the third polarizer and the second polarizer becomes maximum at zero degree of the offset angle and declines gradually in accordance with the increase in absolute value of the offset angle. However, when the offset angle is in a range of plus or minus 30°, the polarization degree can be improved more sufficiently compared with a case when the second polarizer is used alone.

When it is used as a reflective display, by allowing the transmission axis of the second polarizer and the third polarizer to have an offset angle, it becomes possible to reduce the quantity of light incident on the third polarizer after passing through the second polarizer.

Further, the quantity of transflective light obtained through the transmission axis of the second polarizer and the transmission axis of the third polarizer can be very even in a plane, which improves the evenness of display compared with a case when a new light attenuation layer is used.

As described above, the offset angle of the transmission axis is preferably in a range of 0° to plus or minus 30°, but in particular, in order to prevent lowering of the quantity of light emitted from the auxiliary light source, the range from 0° to plus or minus 10° is most suitable.

In addition, by providing plural layers of the third polarizer, improvement in the polarization degree when a light from the auxiliary light source passes through the second polarizer, and in the contrast ratio when it is used as a reflective display is realized.

In such a case, it is preferable to dispose the transmission axis of the third polarizer in the second polarizer side in nearly parallel to the transmission axis of the second polarizer, and to provide an offset angle between the transmission axis of the third polarizer in the auxiliary light source side and the transmission axis of the second polarizer.

That is, by providing a plurality of the third polarizers and the offset angles between respective transmission axes thereof, ensuring of the contrast ratio of the reflective display utilizing external light and improvement in the evenness in display of the transmissive display utilizing an auxiliary light source can be achieved.

In addition, by providing a space between the third polarizer and the auxiliary light source, reflection of light from the auxiliary light source can be reduced in a case of the reflection-type display. In particular, by providing an uneven surface on the bottom surface of the third polarizer, since a light is made incident on the third polarizer, canceling the reflection of the incident light from the auxiliary light source, absorption occurs, and thereby reducing the reflection intensity, which makes the dark display desirable.

Further, by bonding the third polarizer and the second polarizer together, or the third polarizer and the auxiliary light source together, change of the transmission axis of the second polarizer and the transmission axis of the third polarizer can be avoided when the liquid crystal display device is in use.

BRIEF DESCRIPTION OF THE DRAWINGS

FIG. 18 is an enlarged sectional view taken along the line 18—18 in FIG 17.

DETAILED DESCRIPTION OF THE PREFERRED EMBODIMENTS

In order to explain the present invention more in detail, the embodiments of the present invention will be explained with the attached drawings.

First Embodiment: FIG. 1 to FIG. 6

First, a first embodiment of the liquid crystal display device according to the present invention will be explained referring to FIG. 1 to FIG. 6.

Figure 1:
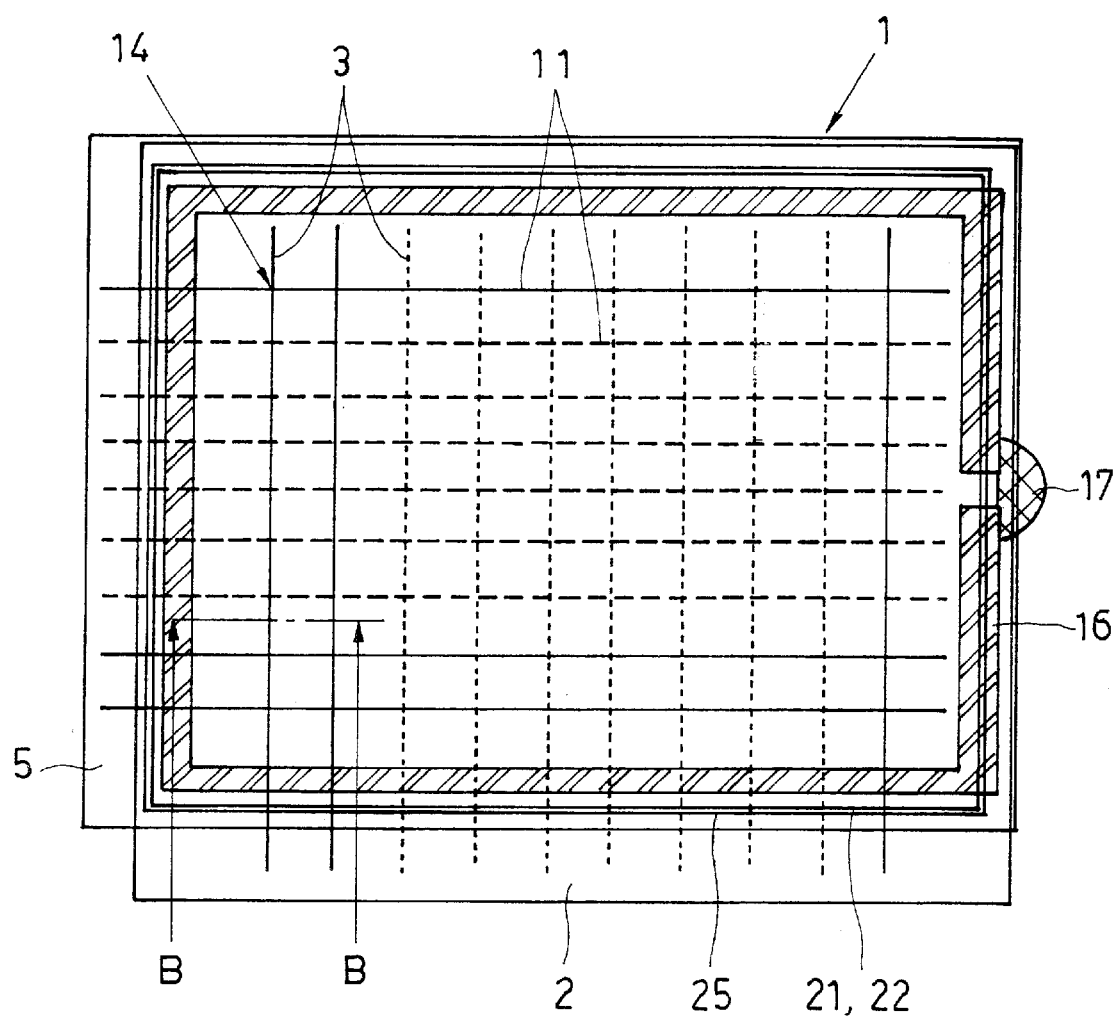
FIG. 1 is a plan view schematically showing the whole of a first embodiment of the liquid crystal display device according to the present invention.
Figure 2:
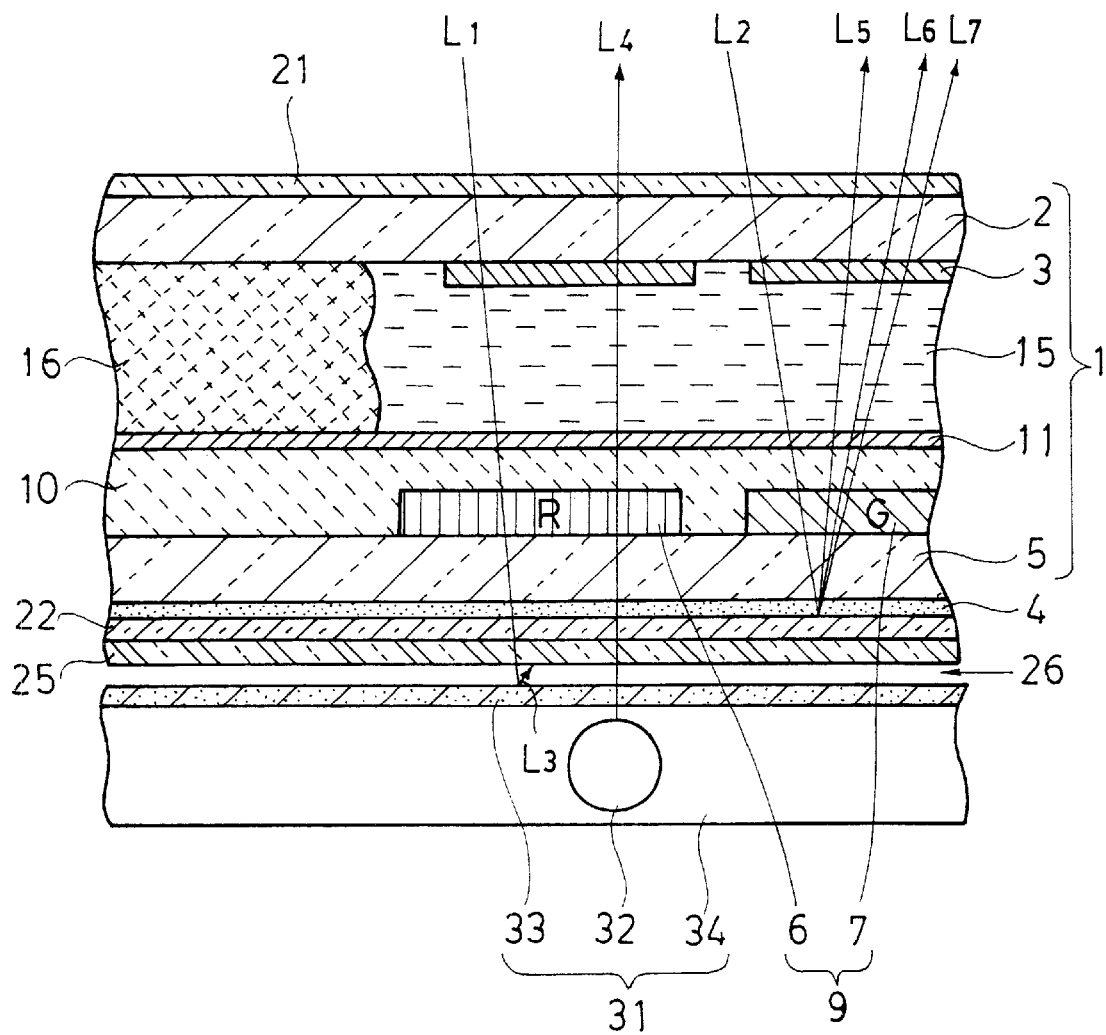
FIG. 2 is a partially enlarged sectional view taken along the line 2—2 in FIG. 1.

FIG. 1 is a plan view schematically showing the whole of a display panel of the liquid crystal display device. Since the most of the constituent members are made of transparent materials and a lower side member among members overlapping vertically each other can be seen through, such a lower side member is also shown with solid lines. FIG. 2 is a partially enlarged schematic sectional view taken along the line 2—2 in FIG. 1. In FIG. 2, a visible side seen by an observer is assumed to be an upper side.

Figure 17:
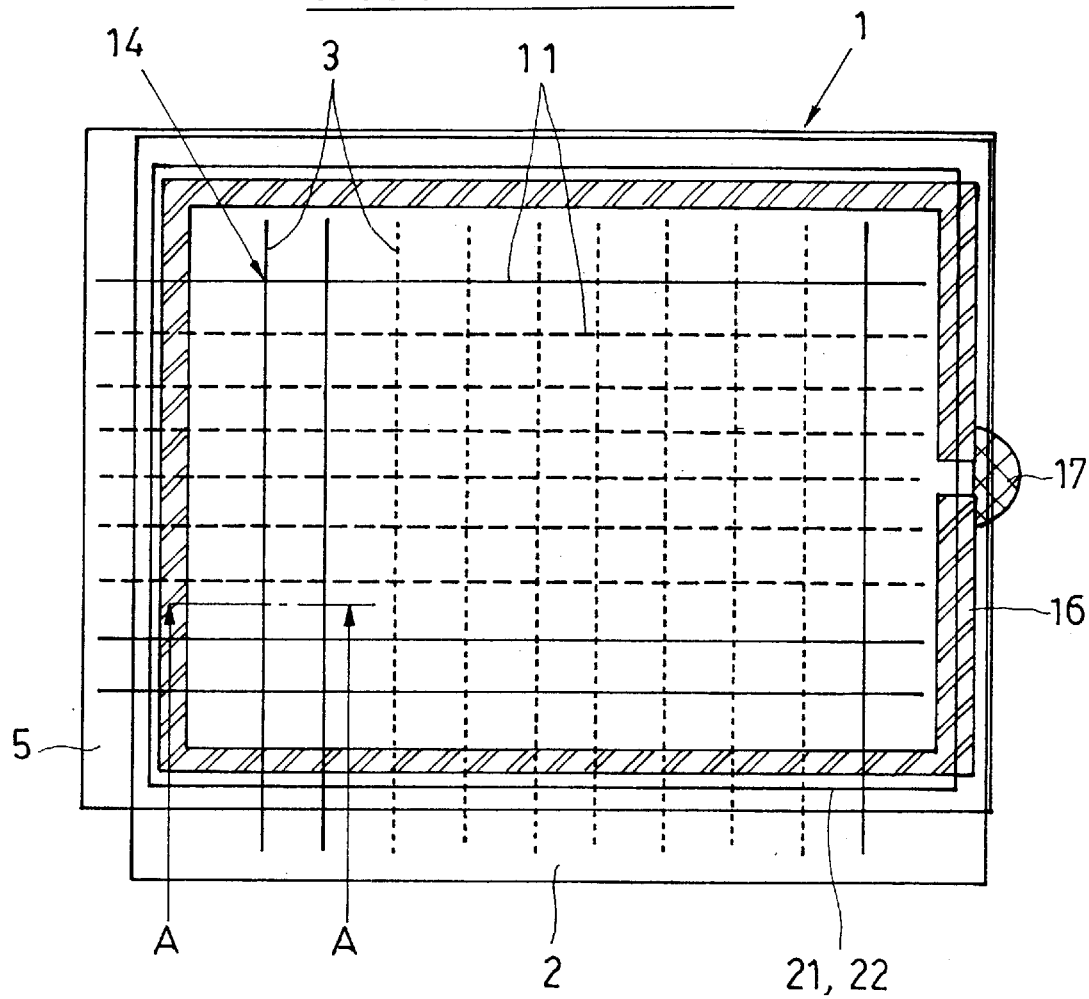
FIG. 17 is a plan view schematically showing the whole of an example of a conventional transflective liquid crystal display device.

In these drawings, the same symbols and numerals are given to the parts corresponding to those in FIG. 17 and FIG. 18.

The present liquid crystal display device is a transflective liquid crystal display device, wherein a liquid crystal cell (optical adjuster) to give an optical change to incident light by applying voltage on a liquid crystal layer 15 is structured by disposing a first substrate 2 and a second substrate 5 made of transparent materials such as glass or the like to face each other with a predetermined space, coupling both substrates with a sealing member 16, and filling a liquid crystal layer 15 in the space.

A first polarizer (polarized light separator) 21 is disposed on the outside of the first substrate 2 (the upper side in FIG. 2), that is a visible side of the liquid crystal cell 1, a second polarizer (polarized light separator) 22 is disposed on the outside of the second substrate 5, that is in the opposite side with respect to the visible side, and an auxiliary light source 31 is provided on the opposite side of the second polarizer 5 with respect to the liquid crystal cell 1.

A third polarizer 25 is further provided between the second polarizer 22 and the auxiliary light source 31 to enhance the polarization degree when emitted light from the auxiliary light source 31 passes through the second polarizer 22 and is emitted into the liquid crystal cell 1 side as a polarized light. The provision of the third polarizer 25 is a characteristic structure of the present invention.

The liquid crystal cell 1 will be further explained in detail. Stripe-shaped signal electrodes 3 made of an indium tin oxide (ITO) film serving as a transparent conductive film are formed on the inner surface of the first substrate 2 in a lateral direction at a predetermined space, as shown in FIG. 1.

On the inner surface of the second substrate 5, a color filter 9 composed of red (R) color filters 6, green (G) color filters 7 and blue (B) color filters (not shown) is provided first, and a protective insulating film 10 is disposed thereon, then strip-shaped scanning electrodes 11 made of ITO film are formed in a longitudinal direction at a predetermined space on the protective insulating film 10, as shown in FIG. 1.

The color filter 9 is formed in a state that the adjacent color filters having two colors respectively are overlapped slightly or abutted on each other. The protective insulation film 10 is provided to flatten the difference in level of the color filter 9 and to prevent deterioration of the signal electrodes 3 due to the pattern forming process.

As shown in FIG. 1, an intersection point of the signal electrode 3 and the scanning electrode 11 intersecting to each other at right angles serves as a pixel portion 14, and a display region is formed with a number of the pixel portions 14 provided in a matrix. Most of the signal electrodes and the scanning electrodes are shown with broken lines in FIG. 1, which means that only a portion thereof is shown and others are omitted, though much more signal electrodes and scanning electrodes are actually formed. Accordingly, a great many number of the pixel portions 14 which are respective intersection portions of the signal electrodes 3 and the scanning electrodes 11 are also formed.

Alignment layers (not shown) as treatment layers to align the liquid crystal layer 15 in a predetermined direction are provided respectively on the opposing surfaces of the first substrate 2 and the second substrate 5.

The first substrate 2 and the second substrate 5 are coupled with a predetermined gap therebetween with the sealing member 16 in a manner that the signal electrodes 3 on the first substrate 2 face the scanning electrodes 11 on the second substrate 5, and the liquid crystal layer 15 is filled through the opening provided in the sealing member 16, and then hermetically closed with a sealant 17 shown in FIG. 1.

Though a twisted nematic (TN) liquid crystal, a super twisted nematic (STN) liquid crystal, or a homeotropic liquid crystal are used for the liquid crystal layer 15, a twisted nematic (TN) liquid crystal having a twist angle of 90° is assumed to be used in this explanation.

A first polarizer 21 provided on the upper side of the first substrate 2 of the liquid crystal cell is an absorption-type polarizer (absorptive polarized light separator) in which one polarization axis is a transmission axis and another polarization axis intersecting with the transmission axis at nearly right angles is an absorption axis, and a second polarizer 22 provided on the bottom side of the second substrate 5 is a reflection-type polarizer (reflective polarized light separator) in which one polarization axis is a transmission axis and another polarization axis intersecting with the transmission axis at nearly right angles is a reflection axis. The first polarizer 21 and the second polarizer 22 are disposed in such a manner that both transmission axes intersect with each other at right angles.

The absorption-type polarizer is formed by adsorbing and aligning dichromatic dyes made of polyiodine, for instance, in a polyvinyl alcohol film (PVA) in its stretching direction. By this treatment, a light linearly polarized in the stretching direction of the PVA film is absorbed and a light linearly polarized in the direction orthogonal to the stretching direction is allowed to transmit.

That is, the stretching direction corresponds to an absorption axis and the direction orthogonal to the absorption axis corresponds to a transmission axis. A light linearly polarized in the direction along the transmission axis can be obtained by making natural light to transmit through the absorption-type polarizer.

The reflection-type polarizer has a structure which is multi-layered in a set of two layers made of, for instance, different polymeric materials. When the different polymeric materials are stretched in a direction (X direction), the refractive index (nx-$M_1$) of one polymeric material ($M_1$) increases while the refractive index (nx-$M_2$) of the other polymeric material ($M_2$) hardly changes.

The refractive index (ny-$M_1$) of one polymeric material ($M_1$) in the direction orthogonal to the stretching direction (Y direction) hardly changes and the refractive index (ny-$M_2$) of the other polymeric material ($M_2$) also hardly changes. As a result, there arises difference in refractive index among X direction and Y direction of the polymeric materials $M_1$ and $M_2$.

In other words, the difference between the refractive indices in X direction ($\Delta$nx) is larger than the difference between the refractive indices in Y direction ($\Delta$ny) and $\Delta$ny becomes nearly zero.

Accordingly, a light in X direction reflects on the interface between the polymeric materials $M_1$ and $M_2$ due to the difference in refractive index. On the contrary, since a light in Y direction has no difference in refractive index, it passes through the polymeric materials $M_1$ and $M_2$.

In other words, in a light incident on the reflection-type polarizer, a linearly polarized light component polarized in X direction is reflected and a linearly polarized light component polarized in Y direction passes through.

By laminating plural layers of such set of the polymeric materials $M_1$ and $M_2$, for instance 200 layers, a reflection-type polarizer can be obtained, in which one polarization axis is a transmission axis and another polarization axis intersecting therewith at nearly right angles is a reflection axis in the visible light region of wavelength 380 nm to 800 nm without depending on the incident angle of light.

The polarization property in the visible light region of a reflection-type polarizer can be obtained in accordance with the thickness of the laminated film composed of a plurality of the layers.

A scattering layer 4 made by mixing a transparent resin and polyvinyl resin beads each different in refractive indices is provided between a second polarizer 22 which is such a reflection-type polarizer and a second substrate 5 in a liquid crystal cell 1, and a third polarizer 25 is fixed on the bottom surface of the second polarizer 22 with an adhesive layer (not shown). For the third polarizer 25, an absorption-type polarizer similar to the first polarizer 21.

An auxiliary light source 31 is provided on further lower side of the third polarizer 25. The auxiliary light source 31 is a backlight device comprised of a fluorescent tube 32, a reflector 34, a prism sheet (not shown) and a diffuser 33.

In a liquid crystal display device according to the first embodiment of the present invention thus configured, as shown in FIG. 2, a first incident light L1 among light from a main light source (external light) in an observer's side (not shown) is made incident on a portion of the liquid crystal layer 15 in which no voltage is applied (background portion) after passing through the first polarizer 21 and the first substrate 2 of the liquid crystal cell 1. Then it is optically rotated or is given a phase difference by the liquid crystal layer 15, is made incident on the color filter 9, passes therethrough, further passes through the second substrate 5 and the scattering layer 4, and reaches the second polarizer 22 which is a reflection-type polarizer.

Since the first incident light L1 passes through the above-described light courses, absorption by each member occurs and when it is made incident on the second polarizer 22, attenuation of the light arises.

In addition, the first incident light L1 becomes a light linearly polarized in a direction parallel to transmission axis of the first polarizer 21 by passing therethrough, is optically rotated by 90° by the liquid crystal layer 15, and is made incident on the second polarizer 22 as a light linearly polarized in a direction parallel to the transmission axis thereof. As a result, it passes through the second polarizer 22, the third polarizer 25 provided on the bottom surface thereof, and reaches the auxiliary light source 31. In order to reduce a first reflection light L3 by the diffuser 33 of the auxiliary light source 31, a space 26 is provided between the third polarizer 25 and the diffuser 33 in the first embodiment.

Therefore, the second polarizer 22 and the third polarizer 25 are bonded while providing an offset angle in a range of 0° to 10° in a clockwise (plus) direction to each transmission axis. The larger the set offset angle is, the more the first reflection light L3 can be reduced.

On the other hand, though the second incident light L2 from external light reaches the second polarizer 22 after passing through the similar course, but it passes through a portion of the liquid crystal layer 15 in which voltage is applied by the signal electrodes 3 and the scanning electrodes 11 of the liquid crystal cell 1.

In this case, the second incident light L2 which becomes a light linearly polarized in a direction parallel to the transmission axis of the first polarizer 21 after passing therethrough is made incident on the second polarizer 22 which is a reflection-type polarizer as a light linearly polarized in a direction parallel to the reflection axis, without being optically rotated by 90° by the liquid crystal layer 15. As a result, it is totally reflected by the second polarizer 22 to become a strong reflection light, and is added a scattering property by the scattering layer 4 and emitted into the observer's side as a second reflection light L5, a third reflection light L6, and a fourth reflection light L7 and so on.

Therefore, in a case of a reflective display by external light, a bright color display in a dark background can be recognized by observers.

In addition, when a fluorescent tube 32 of the auxiliary light source 31 is lit, light L4 emitted from the auxiliary light source 31 is made incident on the second polarizer 22 after passing through the third polarizer 25 and being controlled into a linearly polarized light having a good linearity.

Therefore, in-plane distribution of the polarization degree of the second polarizer 22 (a reflection-type polarizer), or coloring by difference in the polarization degree in the visible light region are improved to such an extent not to be recognized by the observer. It passes through the second polarizer 22 to become a light of high polarization degree linearly polarized in a direction parallel to the transmission axis of the second polarizer 22, and is made incident on the liquid crystal layer 15 of the liquid crystal cell 1. In a portion in which no voltage is applied (background portion), since it is optically rotated by 90°, and is made incident on the first polarizer 21 which is an absorption-type polarizer as a light linearly polarized in a direction parallel to the transmission axis thereof, it is emitted into the observer's side, passing through the first polarizer 21.

In a portion in which voltage is applied to the liquid crystal layer 15 (display portion), since a linearly polarized light of the emitted light L4 from the auxiliary light source 31 is made incident on the first polarizer 21 which is an absorption-type polarizer as a light linearly polarized in a direction parallel to the absorption axis thereof without being optically rotated by 90° by the liquid crystal layer 15, it is absorbed by the first polarizer 21 and hardly emitted into the observer's side.

Therefore, in a case of a transmissive display by the auxiliary light source 31, a dark (black) display in a bright colored background can be recognized by the observer.

Figure 3:
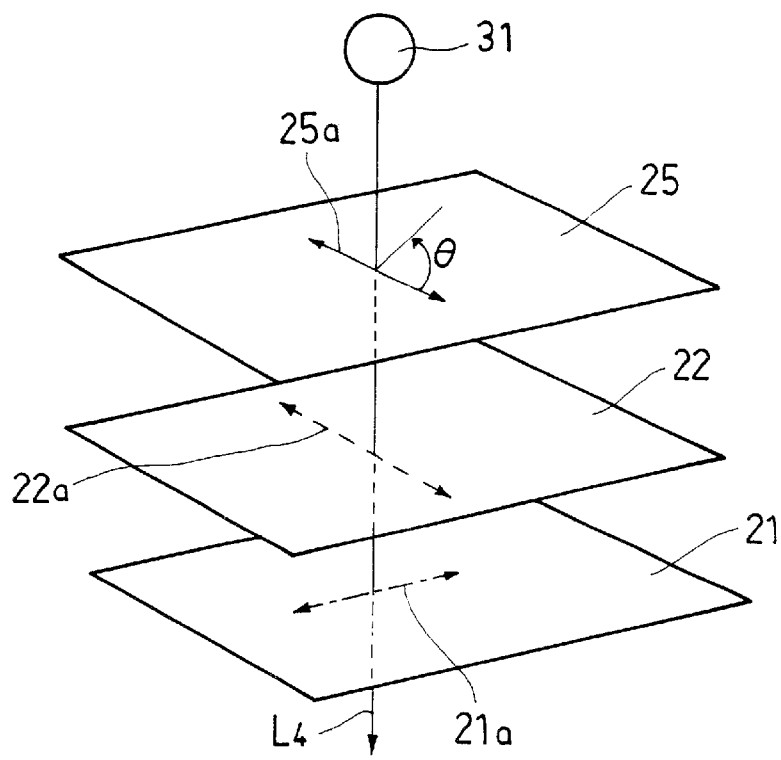
FIG. 3 is an explanatory view showing an optical principle due to a first polarizer 21, a second polarizer 22 and a third polarizer 25 shown in FIG. 2.

Hereinafter, the principle and the specific characteristic of the present invention will be explained with reference to FIG. 3 to FIG. 6. FIG. 3 shows the polarizers 21, 22, 25 and the auxiliary light source 31 in FIG. 1 to FIG. 3, in vertically reversed positional relation with respect to FIG. 2. The liquid crystal cell 1 and others are omitted in FIG. 3 to illustrate its principle only.

As shown in FIG. 3, a transmission axis 21a of the first polarizer 21 and a transmission axis 22a of the second polarizer 22 are to be disposed orthogonally to each other. Accordingly, when the polarization degree of the first polarizer 21 and the polarization degree of the second polarizer 22 are in a desirable state, the quantity of the emitted light L4 (brightness) transmitting into the observer's side (lower side in FIG. 3) from the auxiliary light source 31 is considerably reduced.

Figure 6:
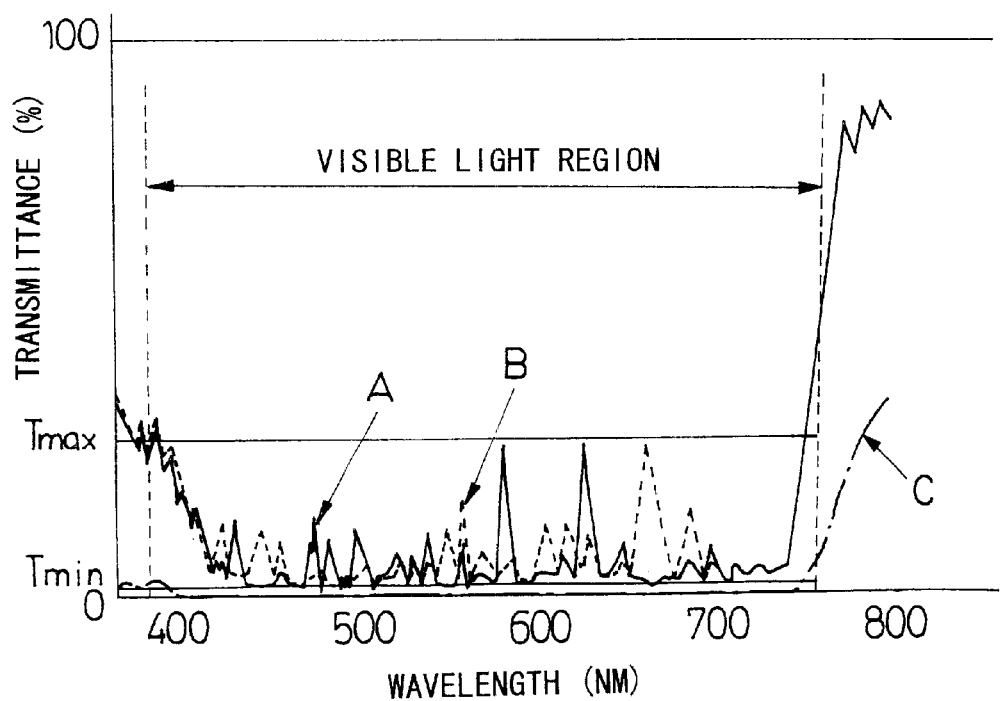
FIG. 6 is a chart showing spectral characteristics of the second polarizer.

FIG. 6 is a chart showing wavelength dependency of transmittance in a case of disposing the first polarizer 21 and the second polarizer 22 so as to intersect respective transmission axes 21a and 22a at right angles. It also shows a specific characteristic when a third polarizer 25 of the present invention is added.

As shown in FIG. 6, with only a combination of the second polarizer 22 used in this invention and an absorption-type polarizer to be used as the first polarizer 21 having a high polarization degree, there gives a portion having large transmittance (Tmax) and a portion having small transmittance (Tmin) in a wavelength range in the visible light region, as illustrated with characteristic curves of the second polarizer using a solid line A and a broken line B.

Since Tmax is as large as 5%, it is recognized by observers as unevenness in lightness, though it depends on the illuminance of the auxiliary light source.

The difference between the characteristic curves of the solid line A and the broken line B comes from partial or lot difference in thickness of each layer because the second polarizer 22 is composed of a multilayer made of plural layers, for instance more than 200 layers.

As a result, since change in the transmittance is created on the same plane or in a shape of a continuous line, it is recognized by observers as an unevenness in brightness in a case of a display with lighting on of the auxiliary light source 31.

Therefore, in the present invention, the third polarizer 25 is provided between the second polarizer 22 and the auxiliary light source 31, as shown in FIG. 3.

Figure 4:
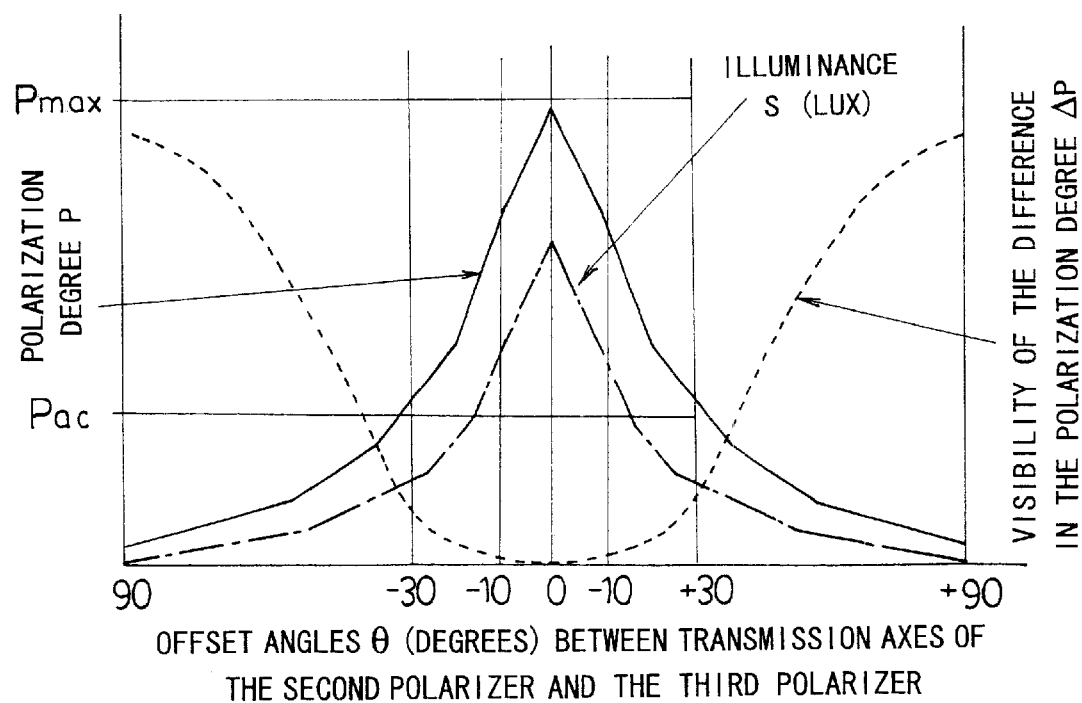
FIG. 4 is a chart showing relationship of offset angles of the second polarizer 22 and the third polarizer 25 versus the polarization degree, visibility of difference in the polarization degree, and illuminance.

FIG. 4 is a chart in which an offset angle (θ) between a transmission axis 25a of the third polarizer 25 and the transmission axis 22a of the second transmission axis 22 is taken along the horizontal axis, polarization degree (P) of the emitted light L4 of the auxiliary light source 31 from the first polarizer 21, visibility of the difference (ΔP) in the polarization degree and illuminance (S) of emitted light from the second polarizer 22 are taken along the vertical axis respectively. Incidentally, the transmission axis 25a of the third polarizer 25 is shown with a plus (+) sign when it optically rotated in a clockwise direction, and with a minus (−) sign when it optically rotated in a counterclockwise direction.

As shown in FIG. 4, the closer to zero the offset angle between the transmission axis 22a of the second polarizer 22 and the transmission axis 25a of the third polarizer 25 becomes, the larger the polarization degree (P) becomes, and the maximum polarization degree reaches Pmax.

The quantity of light (illuminance: S) emitted into the first polarizer 21 side can be increased because the transmission axis 22a coincides with the transmission axis 25a. In other words, a bright display corresponding to disposing the transmission axes 21a and 22a of the first polarizer 21 and the second polarizer 22 in parallel can be a display in bright.

Furthermore, since the polarization degree P is large, the difference in polarization degree of the second polarizer 22 is no longer appeared in the visible light region, the transmittance in the visible light region becomes nearly zero, as shown. with the specific characteristic in the case of this invention by a chain line C in FIG. 6. As a result, unevenness in brightness can not be recognized by the observer.

Each specific characteristic in a case of making the offset angle (θ) of the transmission axis 25a of the third polarizer 25 shown in FIG. 4 variable will be explained. Since the plus (+) direction and the minus (−) are symmetrical, the explanation will be made by using the plus (+) direction as an example. When the offset angle is making larger from zero, the polarization degree of the light L4 emitted from the second polarizer 22 is reduced.

The above explanation is for the case of combining the polarizers 21, 22, 25 and the liquid crystal cell 1, which corresponds a dark display, but in a case corresponding to a bright display, since the transmission axis 22a of the second polarizer 22 does not coincide with the transmission axis 25a of the third polarizer 25, the illuminance of the emitted light from the second polarizer 22 is lowered, thereby making the bright display a display in dark.

Figure 5:
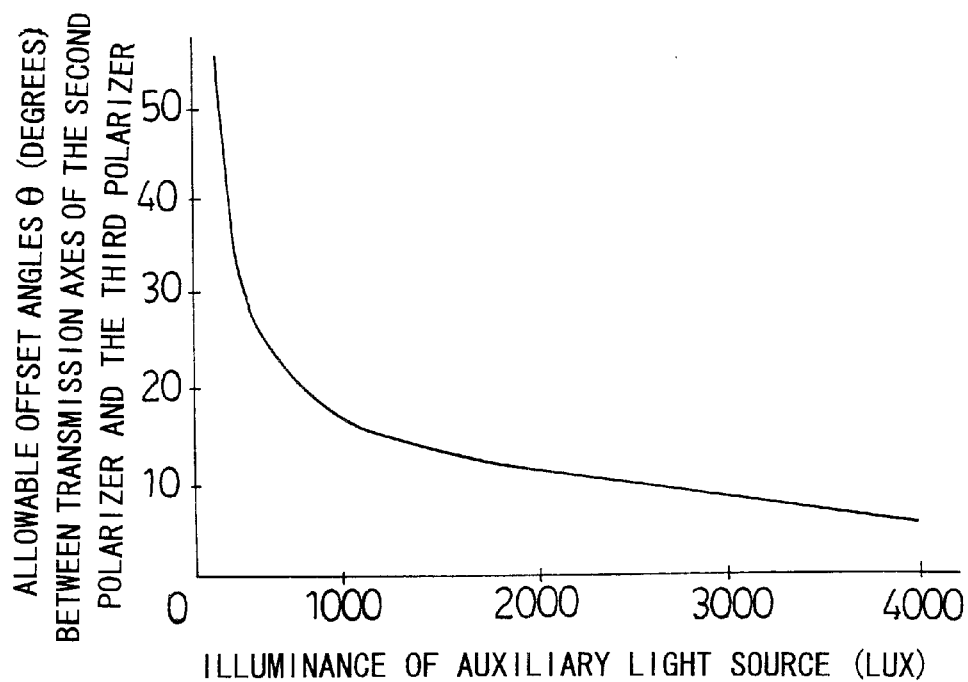
FIG. 5 is a chart showing relationship between the illuminance of an auxiliary light source and the allowable offset angle.

FIG. 5 is a chart showing an acceptable range of the offset angle (θ) between the transmission axis 22a of the second polarizer 22 and the transmission axis 25a of the third polarizer 25 against the distribution of the polarization degree and unevenness of the second polarizer 22 created with the illuminance of the auxiliary light source 31.

The test method comprises the steps of: disposing the transmission axis 21a of the first polarizer 21 and the transmission axis 22a of the second polarizer 22 in a direction intersecting at right angles to each other; rotating the transmission axis 25a of the third polarizer 25 against the transmission axis 22a of the second polarizer 22; and determining whether unevenness created by the auxiliary light source 31 at each illuminance can be recognized by the observer.

In FIG. 5, the horizontal axis shows the illuminance of the auxiliary light source 31, and the vertical axis shows the offset angle (θ). The offset angle (θ) is shown in an absolute value, because the angle in the plus direction and that in the minus direction are symmetrical.

In FIG. 5, the lower the illuminance of the auxiliary light source 31 becomes, the larger the acceptable range of the offset angle θ becomes. This is because the spectral luminosity of human being depends on the brightness of an object.

From the result shown in FIG. 5, considering the relation between power consumption and the brightness of a liquid crystal display device, and attenuation of the brightness of the auxiliary light source 31 into less than 30% due to lowering of transmittance in the pixel portions by the color filters in a liquid crystal display device having the color filters, it is necessary to have the illuminance of the auxiliary light source 31 of more than the equivalent of 500 lux, which makes it preferable to set the range of the offset angle θ to be from 0° to plus or minus 30°.

In a case of a liquid crystal display device which regards brightness as important, since an auxiliary light source of about 3000 lux becomes necessary, the range of the offset angle from 0° to 10° is more preferable. Especially in a case of reducing unevenness of display by using a bright auxiliary light source, it is preferable to make the offset angle θ nearly 0°.

As is clear from the explanation described above, in order to reduce unevenness of display due to insufficiency of polarization degree and in-plane unevenness in polarization degree of the second polarizer 22, it becomes possible to extensively improve non-uniformity of the display due to the second polarizer 22 by providing the third polarizer 25 between the second polarizer 22 and the auxiliary light source 31.

Furthermore, a very uniform display can be attained by restricting the offset angle θ between the transmission axis 22a of the second polarizer 22 and the transmission axis 25a of the third polarizer 25. A display in bright is also realized.

Still further, provision of a space 26 between the third polarizer 25 and the auxiliary light source 31 prevents the light passed through the third polarizer 25 from reflecting by the auxiliary light source 31 and being made incident on the third polarizer 25 again.

By providing a reflector 34 of the auxiliary light source 31 with polarization canceling ability, and by allowing the light to travel between the third polarizer 25 and the auxiliary light source 31, the reflected light can be attenuated through absorption of the third polarizer 25.

Since the light emitted into the observer's side from the second polarizer 22 in a dark state of a reflective display can be made small in a manner described above, a display having a preferable contrast ratio can be realized.

Figure 7:
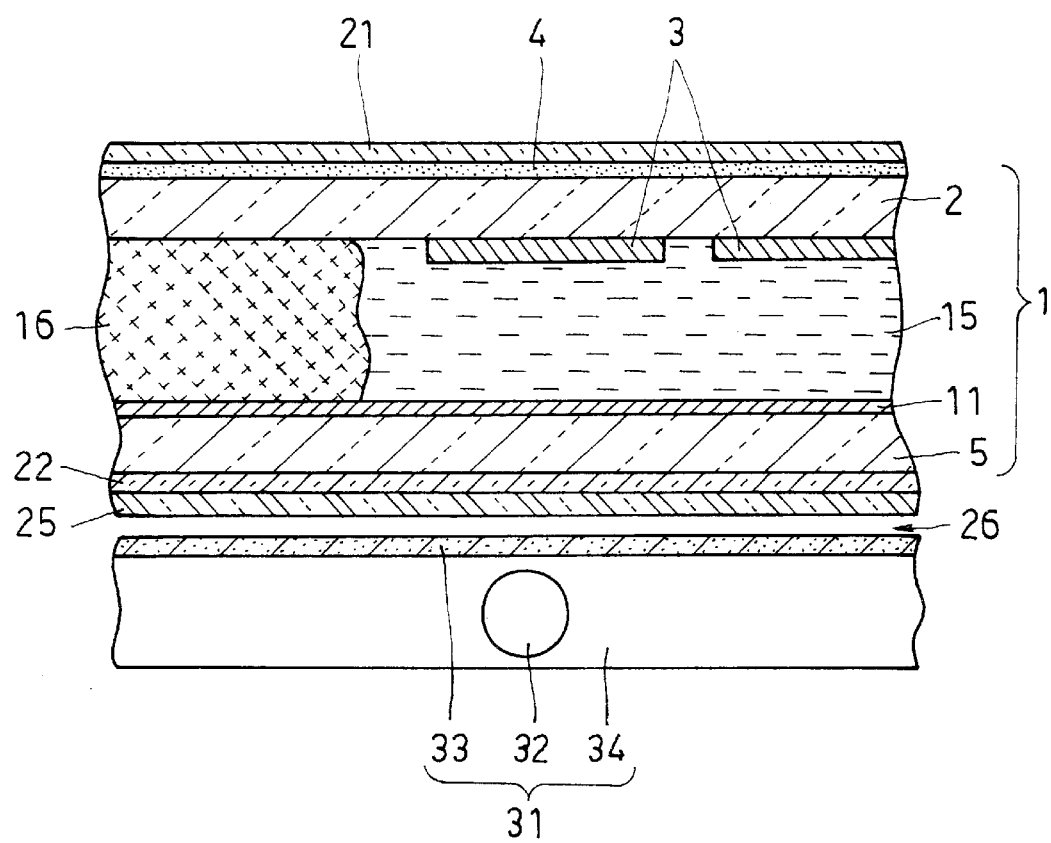
FIG. 7 is a sectional view similar to FIG. 2 showing the configuration of a second embodiment of the liquid crystal display device according to the present invention.

Second Embodiment: FIG. 7

A second embodiment of the liquid crystal display device according to the present invention will be explained with reference to FIG. 7. FIG. 7 is a sectional view similar to FIG. 2 showing the liquid crystal display device, and the same symbols and numerals are attached to the portions corresponding to those in FIG. 2. Therefore, the explanation thereof will be made brief.

The characteristics of the second embodiment is that a scattering layer 4 is provided between a first polarizer 21 and a first substrate 2 of a liquid crystal cell 1 to improve the brightness. The distribution of polarization degree of a second polarizer 22 can be reduced by the scattering layer 4.

The scattering layer 4 is made of transparent acrylic resin and transparent resin beads. The first polarizer 21 is an absorption-type polarizer. The scattering layer 4 is bonded to the first substrate 2 and the first polarizer 21 of the liquid crystal cell 1 with an adhesive.

A reflection-type polarizer as the second polarizer 22 is provided on the bottom side of a second substrate 5 of the liquid crystal cell. A third polarizer 25 is bonded on the bottom side of the second polarizer 22 with an adhesive.

An absorption-type polarizer having a high polarization degree but 42% to 45% of transmittance is used as the third polarizer 25, of which polarization degree being in a range of 99% to 99.99%.

Further, an auxiliary light source 31 is provided under the third polarizer 25 with a space of 0.1 mm to 3 mm thick. The auxiliary light source 31 is comprised of a fluorescence light 32, a reflector 34 and a diffuser 33 to perform a white display. A fourth polarizer (not shown) may be provided between the third polarizer 25 and the diffuser 33 to enhance the luminance of the auxiliary light source 31.

In such a case, it is desirable to dispose a transmission axis of the third polarizer 25 and a transmission axis of the fourth polarizer in parallel with each other in view of brightness and improving the polarization degree when light is emitted from the second polarizer 22 into an observer's side.

In this embodiment, it is possible to improve lack of the polarization degree and to reduce distribution of the polarization degree of the second polarizer 22 by providing the third polarizer 25 between the second polarizer 22 and the auxiliary light source 31.

Furthermore, it is possible to put emphasis on the scattering property by disposing the scattering layer 4 between the first polarizer 21 and the first substrate 2, namely, disposing it nearer to the observer's side than the second polarizer 22 and the liquid crystal layer 15 thereto. Accordingly, it becomes possible to improve whiteness of the display and reduction of illuminance of the auxiliary light source 31, which results in reduction of visibility of distribution or so on of the polarization degree of the second polarizer 22.

Figure 8:
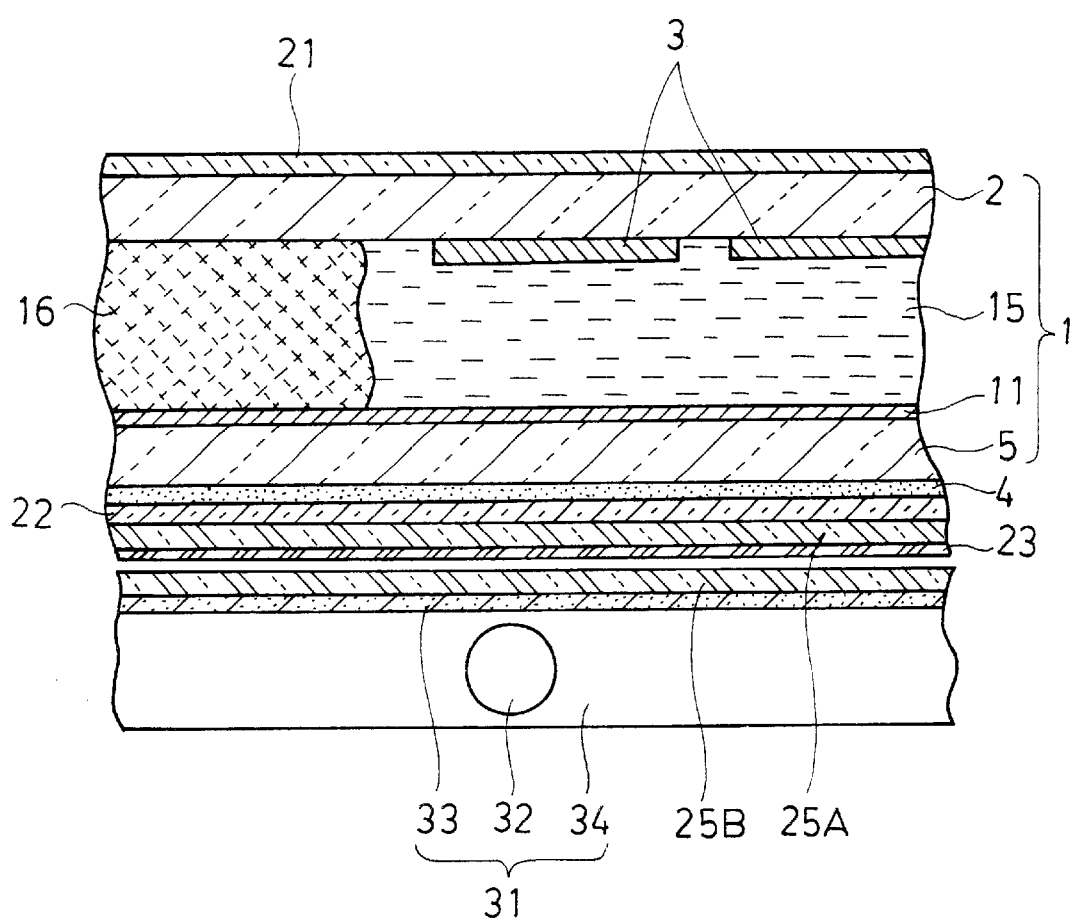
FIG. 8 is a sectional view similar to FIG. 2 showing the configuration of a third embodiment of the liquid crystal display device according to the present invention.

Third Embodiment: FIG. 8

A third embodiment of the liquid crystal display device according to the present invention will be explained with reference to FIG. 8. FIG. 8 is a sectional view similar to FIG. 2 showing the liquid crystal display device, and the same symbols and numerals are attached to the portions corresponding to those in FIG. 2. Therefore, the explanation thereof will be made brief.

The characteristics of the third embodiment is that a plurality of third polarizers 25A and 25B are provided between a second polarizer 22 and an auxiliary light source 31, and a printed layer 23 is provided in-between thereof.

In this liquid crystal display device, an absorption-type polarizer is provided as a first polarizer 21 in a visible side of a first substrate 2 in a liquid crystal cell 1. On the bottom side of a second substrate 5, a scattering layer 4 made of transparent acrylic resin and transparent resin beads, and a reflection-type polarizer as the second polarizer 22 are provided. The scattering layer 4 is bonded to the second substrate 5 and the second polarizer 22 with an adhesive.

Further, an absorption-type polarizer as a third polarizer 25A is provided on the bottom side of the second polarizer 22, and an offset angle between a transmission axis of the second polarizer 22 and a transmission axis of the third polarizer 25A is made nearly 0°. A reflection-type polarizer as a second layer of the third polarizer 25B is provided in the auxiliary light source 31 side of the third polarizer 25A. An offset angle between a transmission axis of the third polarizer 25A and a transmission axis of the third polarizer 25B is made nearly 0°.

Further, a printed layer 23 which passes through a portion of light and absorbs the rest of the light is provided between these two layers of the third polarizers 25A and 25B.

The auxiliary light source 31 comprised of a fluorescent tube 32, a reflector 34 and a diffuser 33 is provided on the bottom of the third polarizer 25B.

By using the liquid crystal display device of the third embodiment, the polarization degree of the light of the auxiliary light source emitted from the second polarizer 22 is extensively improved taking advantage of the third polarizers 25A and 25B, and unevenness of the display due to lack of the polarization degree and distribution of the polarization degree of the second polarizer 22 can be no longer recognized.

In a case of a reflective display, a light passed through the second polarizer 22 can be absorbed by the printed layer 23 disposed between two layers of the third polarizers 25A and 25B. Besides, a slight light reflected from the third polarizer 25B can be absorbed by the printed layer 23, which results in a good dark display.

Furthermore, out of the light emitted from the auxiliary light source 31, a linearly polarized light component polarized in a direction along the transmission axis of the third polarizer 25B is passed through, and a linearly polarized light component polarized in a direction along the reflection axis thereof is reflected by the third polarizer 25B provided on the auxiliary light source 31. The reflected light undergoes dissolution of the polarization and reflection by the diffuser 33 and the reflector 34, and reaches the third polarizer 25B again.

Accordingly, a linearly polarized light component polarized in a direction along the transmission axis of the third polarizer 25B comes to be contained so that the reflected light into the auxiliary light source 31 side is reused, whereby the quantity of emitted light from the auxiliary light source 31 reaching the second polarizer 22 can be increased.

Therefore, it also results in improvement in the polarization degree of the emitted light from the second polarizer 22 and improvement in brightness of the emitted light from the auxiliary light source 31.

By adopting the above-described structure, it becomes possible to improve the contrast ratio, especially that in a dark display, by the printed layer 23 in a case of a reflective display. In a case of a transmissive display, extensive improvement in the contrast ratio and evenness of the display owing to the improvement in polarization degree of the second polarizer 22 can be realized by two layers of the third polarizers 25A and 25B.

Furthermore, by the third polarizer 25B provided on the auxiliary light source 31 side, lost light can be used again, thereby realizing a display in bright in a case of a bright display of a transmissive display even when absorption by the printed layer 23 arises.

Since the polarization degree is corrected by the third polarizer 25A provided on the second polarizer 22 side even if the polarization degree of polarization by the third polarizer 25B gets worse by the printed layer 23, polarization degree of the light emitted from the second polarizer 22 becomes very favorable. Thus, a display quality of the reflection display and the transmission display of the liquid crystal display device can be improved.

Figure 9:
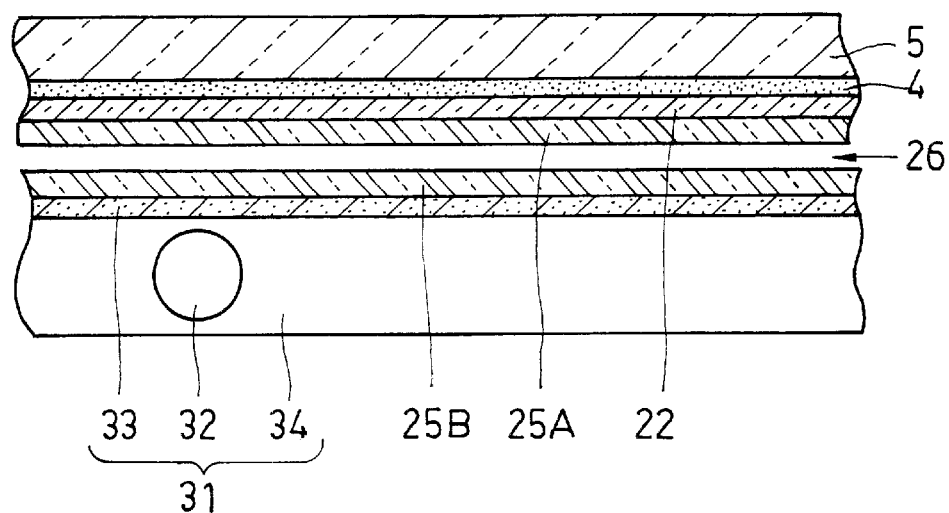
FIG. 9 is a sectional view similar to FIG. 2 showing only portions lower than a second substrate of a fourth embodiment of the liquid crystal display device according to the present invention.

Fourth Embodiment: FIG. 9

A fourth embodiment of the liquid crystal display device according to the present invention will be explained next with reference to FIG. 9. FIG. 9 is a sectional view similar to FIG. 2 showing only portions lower than a second substrate of the liquid crystal display device. Portions corresponding to those in FIG. 2 are attached with the same symbols and numerals, which will be explained briefly.

The fourth embodiment is characterized in that a plurality of the third polarizers 25A and 25B are provided between the second polarizer 22 and the auxiliary light source 31, and a space 26 is provided between the two layers of the third polarizers 25A and 25B instead of a printed layer.

The liquid crystal display device includes a scattering layer 4 composed of a transparent adhesive and transparent resin beads having little retardation, and a reflection-type polarizer as the second polarizer 22 provided on the bottom side (opposite to the visible side) of the second substrate 5 in the liquid crystal cell 1 (not shown).

An absorption-type polarizer as the third polarizer 25A is provided on the bottom side of the second polarizer 22, and an offset angle between the transmission axis of the second polarizer 22 and the transmission axis of the third polarizer 25A is set to 20°.

In a reflective display, owing to this offset angle, absorption is occurred to a linearly polarized light passed through the second polarizer 22 by the third polarizer 25A, thereby reducing amount of emitted light into the bottom side and amount of reflected light into the observer's side from the second polarizer 22, which results in improvement of a dark state.

Besides, a reflection-type polarizer as a second layer of the third polarizer 25B is provided on the auxiliary light source 31 side. An offset angle between transmission axes of the third polarizers 25A and 25B is set to be nearly 0°.

This is because, reflection from a reflection axis of the third polarizer 25B on the auxiliary light source 31 side occurs when an offset angle is provided between transmission axes of the two layers of the third polarizers 25A and 25B, which results in deterioration of a dark display in a case of a reflective display.

Further, a space 26 is provided between two layers of the third polarizers 25A and 25B to reduce a reflected light from the third polarizer 25B on the auxiliary light source 31 side being made incident on the third polarizer 25A on the second polarizer 22 side.

Moreover, the auxiliary light source 31 composed of a fluorescent tube 32, a reflector 34 and a diffuser 33 is provided on the bottom side of the third polarizer 25B.

By adopting the above-described structure, the polarization degree of a light of the auxiliary light source 31 emitted from the second polarizer 22 is extensively improved by the third polarizers 25A and 25B, and unevenness of the display caused by lack of polarization degree and distribution of the polarization degree of the second polarizer 22 can not be recognized at all.

By disposing the transmission axes of a plurality of third polarizers 25A and 25B in parallel with each other, the polarization degree becomes very large.

Accordingly, an offset angle is provided between the transmission axes of the third polarizers 25A, 25B and the transmission axis of the second polarizer 22.

However, since the polarization degree can be kept in a desirable state owing to lamination of the third polarizers 25A and 25B, the polarization degree of light passing through the second polarizer 22 can be kept in a good state.

In a case of reflective display, since an offset angle exists between the transmission axis of the second polarizer 22 and the transmission axis of the third polarizer 25A, which results in a good dark display so that a display with a desirable contrast ratio can be obtained.

Furthermore, a light which has been lost can be reused by a reflection-type polarizer used as the third polarizer 25B on the auxiliary light source 31 side, which results in improvement in efficiency of the auxiliary light source 31 so that a bright transmissive display with excellent uniformity can be realized.

Figure 10:
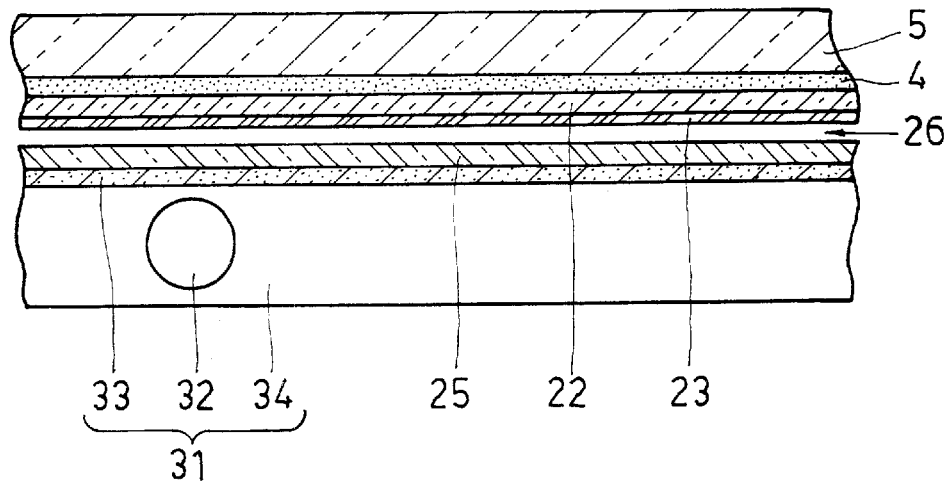
FIG. 10 is a sectional view similar to FIG. 9 showing the configuration of a fifth embodiment of the liquid crystal display device according to the present invention.

Fifth Embodiment: FIG. 10

A fifth embodiment of the liquid crystal display device according to the present invention will be explained next with reference to FIG. 10. FIG. 10 is a sectional view similar to FIG. 9 showing only portions lower than a second substrate of the liquid crystal display device. Portions corresponding to those in FIG. 9 are attached with the same symbols and numerals, which will be explained briefly.

The fifth embodiment is characterized in that a printed layer 23 and a third polarizer 25 are provided in order from the second polarizer 22 side between the second polarizer 22 and the auxiliary light source 31.

The liquid crystal display device includes a scattering layer 4 composed of a transparent adhesive and transparent resin beads having little retardation, and a reflection-type polarizer as the second polarizer 22 provided on the bottom side (opposite to the visible side) of the second substrate 5 in the liquid crystal cell 1 (not shown).

A printed layer 23 is provided on the bottom side of the second polarizer 22, and a third polarizer 25 is provided on the lower side of the printed layer 23 with a space in-between thereof.

An offset angle between the transmission axis of the second polarizer 22 and the transmission axis of the third polarizer 25 is set to be nearly 0°. An auxiliary light source 31 disposed on the bottom side of the third polarizer 25 is composed of a fluorescent tube 32, a reflector 34 and a diffuser 33.

In the fifth embodiment, since a bright display utilizes the diffuser 4 and reflection characteristic of the reflection-type polarizer used as the second polarizer 22 in a case of a reflective display, it is bright because of no absorption occurred in the polarizer. In a case of a dark display, absorption by the printed layer 23 is utilized.

In order to prevent dissolution of polarization by the printed layer 23, a mixture of carbon powder and white fluorescent pigment in acrylic resin which has no polarization and retardation, is used for the printed layer 23.

When retardation is occurred, it is possible to newly insert a retardation film between the printed layer 23 and the third polarizer 25.

By adopting the above-described structure, since light can be reused by using a reflection-type polarizer as the third polarizer 25 in a case of a transmissive display, the utilization efficiency of the auxiliary light source 31 can be improved.

Besides, since both of the second polarizer 22 and the third polarizer 25 are reflection-type polarizers, a dark display of a reflective display can be made dark by providing the printed layer 23 between the second polarizer 22 and the third polarizer 25.

Therefore, when the reflection-type polarizer is used for both second polarizer 22 and third polarizer 25, a very effective structure can be obtained.

Figure 11:
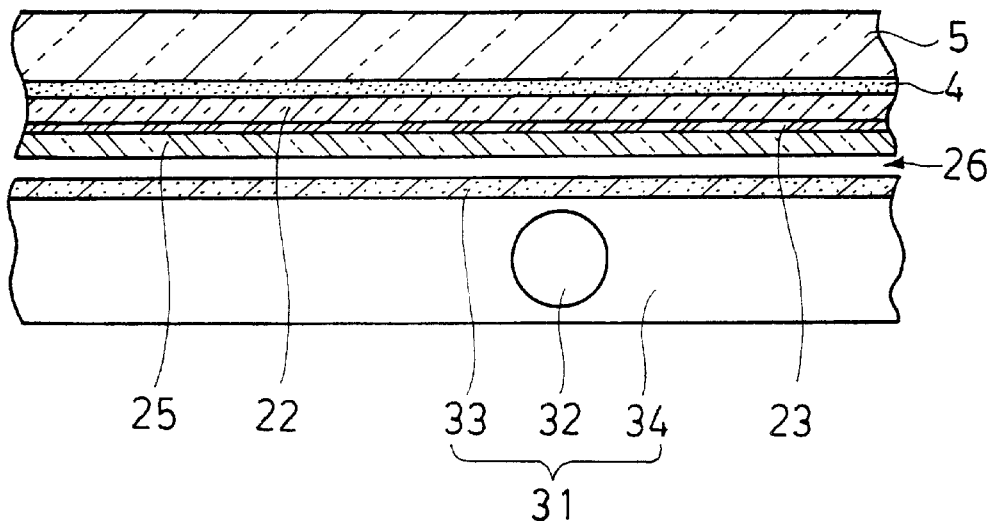
FIG. 11 is a sectional view similar to FIG. 9 showing the configuration of a sixth embodiment of the liquid crystal display device according to the present invention.

Sixth Embodiment: FIG. 11

A sixth embodiment of the liquid crystal display device according to the present invention will be explained next with reference to FIG. 11. FIG. 11 is a sectional view similar to FIG. 9 showing only portions lower than a second substrate of the liquid crystal display device. Portions corresponding to those in FIG. 9 are attached with the same symbols and numerals, which will be explained briefly.

The sixth embodiment is characterized in that a printed layer 23 and a third polarizer 25 are provided in order from a second polarizer 22 side between the second polarizer 22 and an auxiliary light source 31, and the printed layer 23 and the third polarizer 25 are bonded together.

The liquid crystal display device is also provided with a scattering layer 4 composed of transparent acrylic adhesive and transparent resin beads, and a reflection-type polarizer as the second polarizer 22 on the bottom side of a second substrate 5 of a liquid crystal cell 1 (not shown).

The printed layer 23 is provided on the bottom side of the second polarizer 22. Further, the third polarizer 25 which is bonded to the printed layer 23 with an adhesive.

Furthermore, the auxiliary light source 31 is provided on the bottom side of the third polarizer 25, and a space 26 is provided between the third polarizer 25 and the auxiliary light source 31.

An offset angle between the transmission axis of the second polarizer 22 and the transmission axis of the third polarizer 25 is set to be nearly 0°.

In order to stabilize and fix the offset angle between the second polarizer 22 and the third polarizer 25, it is preferable to bond the second polarizer 22 and the third polarizer 25 together. The auxiliary light source 31 is composed of a fluorescence tube 32, a reflector 34 and a diffuser 33.

In the sixth embodiment, in a case of a reflective display, a bright display utilizes the scattering layer 4 and a reflection characteristic of a reflection-type polarizer used as the second polarizer 22, therefore a display in bright can be realized because no absorption occurs in polarizers.

In a case of a dark display, absorption of the printed layer 23 is utilized. In order to prevent dissolution of polarization by the printed layer 23, a mixture of carbon powder and white fluorescent pigment in acrylic resin which has no polarization and retardation, is used for the printed layer 23.

When retardation is occurred, it is recommendable to newly insert a retardation film between the second polarizer 22 and the printed layer 23, and to bond the second polarizer 22, the retardation film, the printed layer 23 and the third polarizer 25 all together.

By adopting the above-described structure, since light can be reused by using a reflection-type polarizer as the third polarizer 25 in a case of a transmissive display, the utilization efficiency of the auxiliary light source 31 can be improved.

Besides, in a case when the third polarizer 25 is fixed to the auxiliary light source 31, an error is apt to arise to the offset angle of the transmission axis of the second polarizer 22, it becomes possible to stabilize the offset angle by bonding the third polarizer 25 on the second polarizer 22 side.

At the same time, it is possible to protect the printed layer 23 from flaws or moisture with the third polarizer 25.

Figure 12:
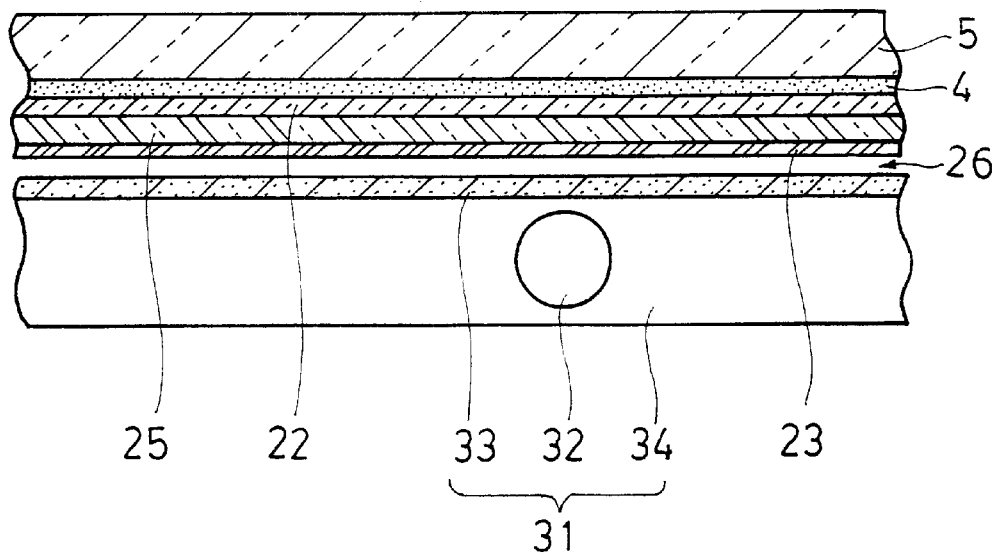
FIG. 12 is a sectional view similar to FIG. 9 showing the configuration of a seventh embodiment of the liquid crystal display device according to the present invention.

Seventh Embodiment: FIG. 12

A seventh embodiment of the liquid crystal display device according to the present invention will be explained next with reference to FIG. 12. FIG. 12 is a sectional view similar to FIG. 9 showing only portions lower than a second substrate of the liquid crystal display device. Portions corresponding to those in FIG. 9 are attached with the same symbols and numerals, which will be explained briefly.

The seventh embodiment is characterized in that a third polarizer 25 and a printed layer 23 are provided in order from the second polarizer 22 side between the second polarizer 22 and the auxiliary light source 31.

The liquid crystal display device is also provided with a scattering layer 4 composed of transparent adhesive and transparent resin beads having little retardation, and a reflection-type polarizer as the second polarizer 22 on the bottom side of the second substrate 5 of the liquid crystal cell 1 (not shown).

Then, a third polarizer 25 is provided on the bottom side of the second polarizer 22. A printed layer 23 is provided on the bottom surface of the third polarizer.

Moreover, an auxiliary light source 31 is provided on the bottom side of the printed layer 23, and a space 26 is provided between the printed layer 23 and the auxiliary light source 31. An offset angle between the transmission axis of the second polarizer 22 and the transmission axis of the third polarizer 25 is set to be nearly 0°.

The third polarizer 25 adopts an absorption-type polarizer capable of obtaining high polarization degree to improve the polarization degree. Besides, in order to prevent dissolution of polarization due to the printed layer 23, the printed layer 23 is not provided between the second polarizer 22 and the third polarizer 25 but is provided on the bottom surface of the third polarizer 25. Incidentally the auxiliary light source 31 is composed of a fluorescent tube, a reflector 34 and a diffuser 33.

In the seventh embodiment, in a case of a reflective display, since a bright display utilizes the scattering layer 4 and reflection characteristic of a reflection-type polarizer used as the second polarizer 22, it is bright because of no absorption occurred in each polarizer.

Since a dark display utilizes twice transmission of the third polarizer 25 and absorption by the printed layer 23, a desirable dark display can be realized.

Furthermore, in this embodiment, since the extent of dissolution of polarization by the printed layer 23 is irrespective, materials for the printing layer 23 can be selected in a manner to take top priority to evenness of the transmittance.

Figure 13:
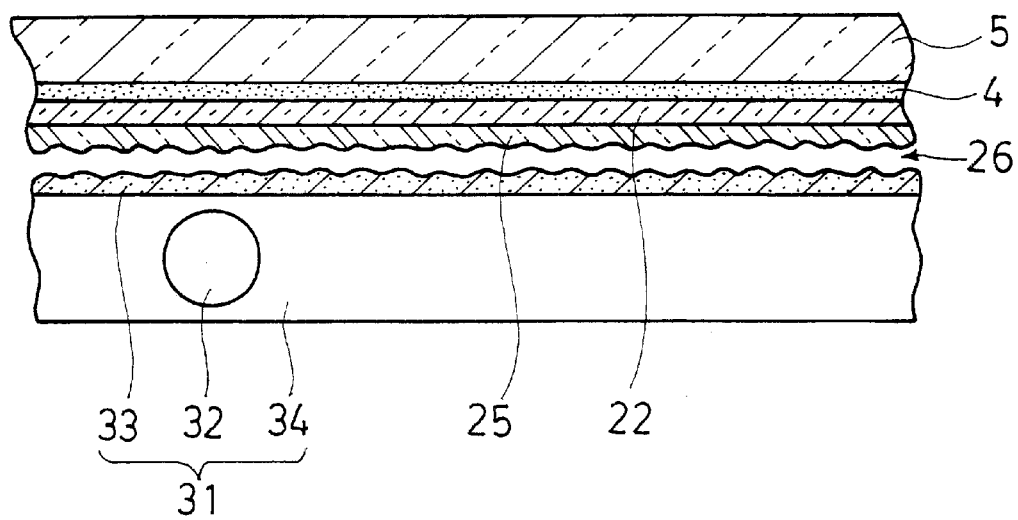
FIG. 13 is a sectional view similar to FIG. 9 showing the configuration of an eighth embodiment of the liquid crystal display device according to the present invention.

Eighth Embodiment: FIG. 13

An eighth embodiment of the liquid crystal display device according to the present invention will be explained next with reference to FIG. 13. FIG. 13 is a sectional view similar to FIG. 9 showing only portions lower than a second substrate of the liquid crystal display device. Portions corresponding to those in FIG. 9 are attached with the same symbols and numerals, which will be explained briefly.

The eighth embodiment is characterized in that a third polarizer 25 having minute unevenness (embossing) on the bottom surface thereof is provided between a second polarizer 22 and an auxiliary light source 31, and a minute unevenness (embossing) is also provided on the top surface of a diffuser 33 of the auxiliary light source 31.

This liquid crystal display device is also provided with a scattering layer 4 composed of transparent adhesive and transparent resin beads having little retardation, and a reflection-type polarizer as the second polarizer 22 on the bottom side of the second substrate 5 of the liquid crystal cell 1 (not shown).

The third polarizer 25 made of an absorption-type polarizer is provided on the bottom side of the second polarizer 22. The auxiliary light source 31 is provided on the bottom side of the third polarizer 25 with a predetermined space 26.

The minute embossings on the bottom surface of the third polarizer 25 and on the top surface of the diffuser 33 of the auxiliary light source 31 contribute to a reflective display, especially to a dark display thereof. That is, a linearly polarized light passing through the second polarizer 22 undergoes dissolution of polarization by the embossings on the bottom surface of the third polarizer 25 and on the top surface of the diffuser 33 of the auxiliary light source 31, and a reflected light from the auxiliary light source 31 is partially absorbed by an absorption axis of the third polarizer 25, thereby reducing the light reaching the observer's eyes.

In a case of a transmissive display by lighting up a fluorescent tube 32 of the auxiliary light source 31, since the embossings on the bottom surface of the third polarizer 25 and on the top surface of the diffuser 33 contribute only to change of the incident light into scattering light, the light from the second polarizer 22 can be extensively improved in its polarization degree by the third polarizer 25 and the second polarizer 22.

As a result, the observer can no longer recognize lowering of the display quality caused by distribution of polarization degree and lack of polarization degree of the second polarizer 22.

Figure 14:
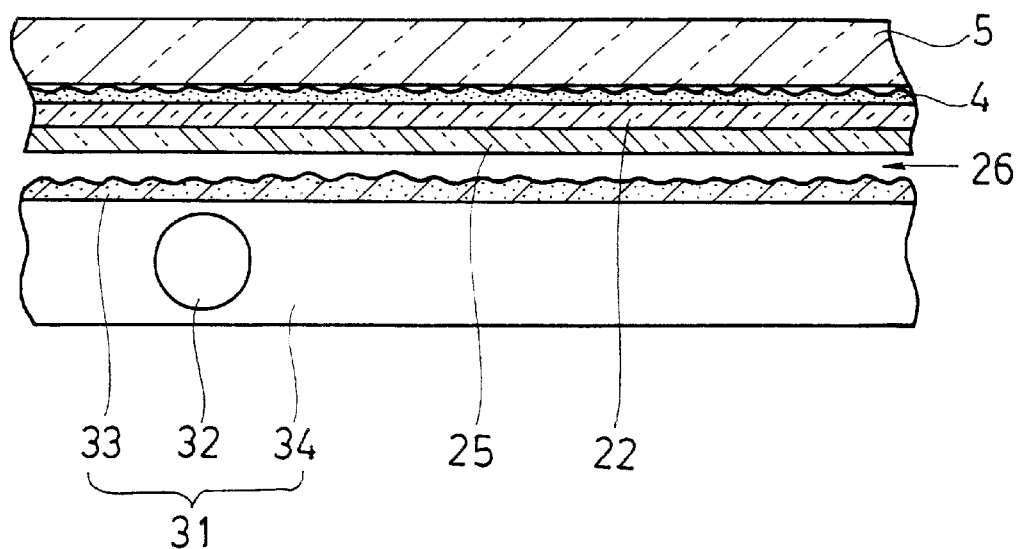
FIG. 14 is a sectional view similar to FIG. 9 showing the configuration of a ninth embodiment of the liquid crystal display device according to the present invention.

Ninth Embodiment: FIG. 14

A ninth embodiment of the liquid crystal display device according to the present invention will be explained next with reference to FIG. 14. FIG. 14 is a sectional view similar to FIG. 9 showing only portions lower than a second substrate of the liquid crystal display device. Portions corresponding to those in FIG. 9 are attached with the same symbols and numerals, which will be explained briefly.

The ninth embodiment is characterized in that minute unevenness (embossing) is formed on the top surface of a diffuser 33 which constitutes an auxiliary light source 31, and minute unevenness is also formed on a surface of a scattering layer 4 contacting with a second substrate 5 of a liquid crystal cell 1.

The liquid crystal display device is provided with the scattering layer 4 having minute unevenness formed by press-treating a triacetyl cellulose (TAC) material having small retardation, or by spraying minute particles on a surface of the TAC material, on the bottom surface of the second substrate 5 in the liquid crystal cell 1 (not shown). The scattering layer 4 may be bonded to the second substrate 5 or it may be only disposed thereon. A reflection-type polarizer as the second polarizer 22 is provided on the bottom side of the scattering layer 4.

The third polarizer 25 made of an absorption-type polarizer is provided on the bottom side of the second polarizer 22. An auxiliary light source 31 is provided on the bottom side of the third polarizer 25 with a predetermined space 26.

The auxiliary light source 31 is composed of a fluorescent tube 32, a reflector 34 and a diffuser 33. The minute embossing is formed on the top surface of the diffuser 33 facing the third polarizer 25. A dark display of the reflective display can be improved by the minute embossing. In other words, since dissolution of polarization proceeds by the embossing on the surface of the diffuser 33 forming the auxiliary light source 31, a reflected light from the auxiliary light source 31 is absorbed by an absorption axis of the third polarizer 25. As a result, only a weak light reaches the observer's eyes.

In a case of a transmissive display to light a fluorescent tube 32 of the auxiliary light source 31, since the embossing on the top surface of the diffuser 33 contributes only to a function to change an emitted light into a scattering light, the polarization degree of the linearly polarized light emitted from the second polarizer 22 can be extensively improved by the third polarizer 25 and the second polarizer 22.

As a result, the observer can no longer recognize lowering of the display quality caused by distribution of polarization degree and lack of the polarization degree of the second polarizer 22. Especially, since provision of a light attenuation layer having a translucent property is not required, it is possible to prevent unevenness of the display due to in-plane distribution of the transmittance and flaws of the light attenuation layer.

Figure 15:
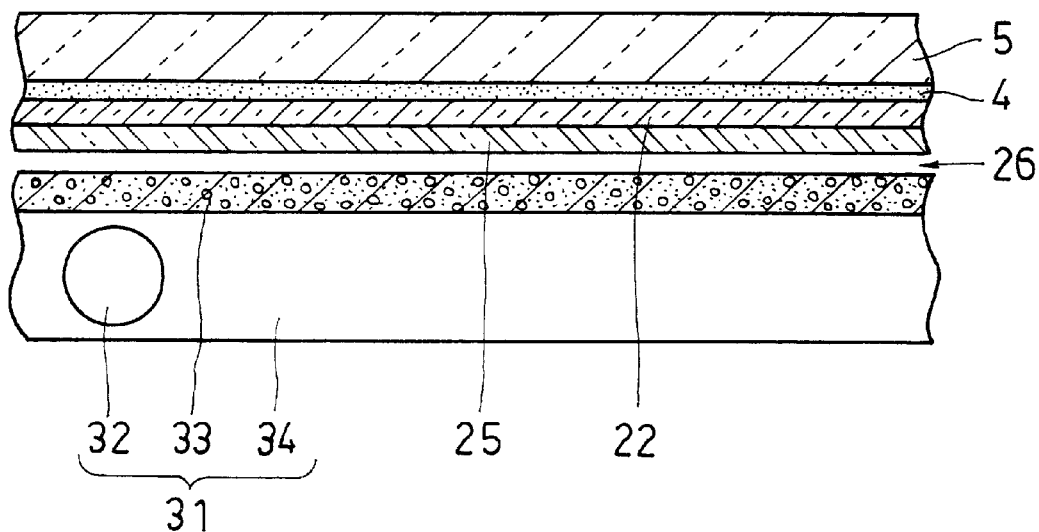
FIG. 15 is a sectional view similar to FIG. 9 showing the configuration of a tenth embodiment of the liquid crystal display device according to the present invention.

Tenth Embodiment: FIG. 15

A tenth embodiment of the liquid crystal display device according to the present invention will be explained next with reference to FIG. 15. FIG. 15 is a sectional view similar to FIG. 9 showing only portions lower than a second substrate of the liquid crystal display device. Portions corresponding to those in FIG. 9 are attached with the same symbols and numerals, which will be explained briefly.

The tenth embodiment is characterized in that a third polarizer 25 is bonded to a second polarizer 22, and a translucent diffuser (light attenuation layer) absorbing a part of light is adopted as a diffuser 33 of an auxiliary light source 31.

In the liquid crystal display device, the second polarizer 22 made of a reflection-type polarizer is bonded to the bottom side of a second substrate 5 of a liquid crystal cell 1 (not shown) using a scattering layer 4 which is made by mixing an adhesive having low retardation and resin beads different in refractive index.

A third polarizer 25 made of an absorption-type polarizer is provided on the bottom side of the second polarizer 22. The auxiliary light source 31 is provided on the bottom side of the third polarizer 25 through a predetermined space 26. The auxiliary light source 31 is composed of a fluorescent tube 32, a reflector 34 and a diffuser 33.

As the diffuser 33 facing the third polarizer 25, a film which is made by dispersing carbon powder into plastic resin, forming into a plate-shape and providing with minute unevenness on the surface thereof, is used. The minute unevenness is formed by molding with a mold, surface processing with a press machine, a blast treatment with accelerated powder, or the like.

In a case of a reflective display, absorption is occurred in a linearly polarized light passing through the second polarizer 22 because the light passes through the third polarizer 25 twice. In addition, a portion of light is absorbed (attenuated) by the diffuser 33 constituting the auxiliary light source 31, and the rest is reflected as a reflected light into the third polarizer 25.

The reflected light from the auxiliary light source 31 is partially absorbed by an absorption axis of the third polarizer 25 and reflected again by a reflection axis of the second polarizer 22 into the third polarizer 25 side, and absorption occurs again by the third polarizer 25. Then a portion of linearly polarized light component parallel to the transmission axis of the second polarizer 22 is reflected and emitted into the observer's side, which results in a desirable dark display.

In a case of a transmissive display to light on the fluorescent tube 32 of the auxiliary light source 31, absorption by carbon powder of the diffuser 33 occurs, thereby decreasing the quantity of light of the auxiliary light source 31.

However, the contrast ratio in a case of a reflective display can be largely improved, and degradation of a display quality caused by distribution of polarization degree and lack of the polarization degree in a case of a transmissive display can be extensively improved.

Figure 16:
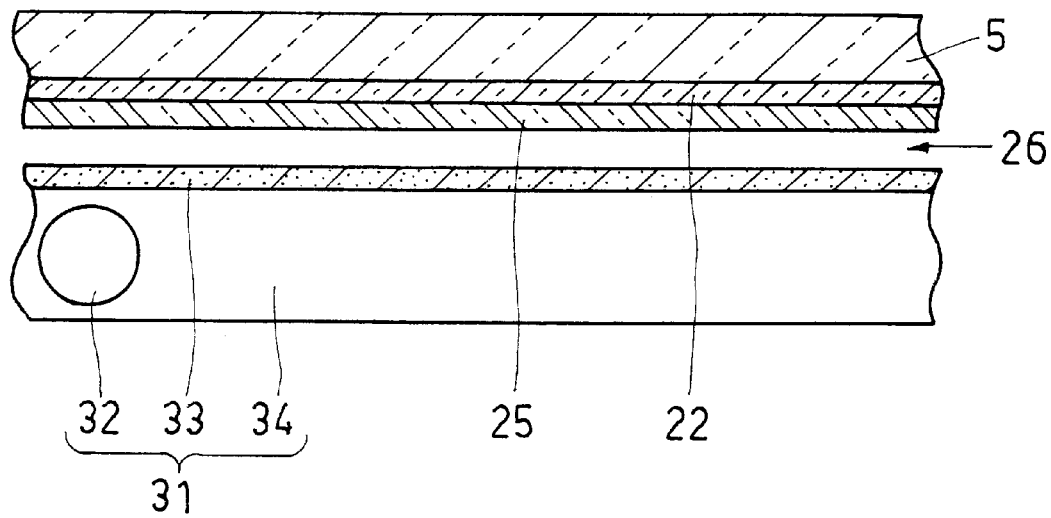
FIG. 16 is a sectional view similar to FIG. 9 showing the configuration of an eleventh embodiment of the liquid crystal display device according to the present invention.

Eleventh Embodiment: FIG. 16

An eleventh embodiment of the liquid crystal display device according to the present invention will be explained next with reference to FIG. 16. FIG. 16 is a sectional view similar to FIG. 9 showing only portions lower than a second substrate of the liquid crystal display device. Portions corresponding to those in FIG. 9 are attached with the same symbols and numerals, which will be explained briefly.

The eleventh embodiment is characterized in that no scattering layer is provided between a second substrate 5 of a liquid crystal cell 1 and a second polarizer 22 so that a mirror display is formed.

In this liquid crystal display device, the second polarizer 22 made of a reflection-type polarizer is provided on the bottom side of the second substrate 5 of the liquid crystal cell 1 which is not shown.

A third polarizer 25 made of an absorption-type polarizer is provided on the bottom side of the second polarizer 22, and an auxiliary light source 31 is provided on the bottom side thereof with a predetermined space 26. The auxiliary light source 31 is composed of a fluorescent tube 32, a reflector 34 and a diffuser 33.

In a case of a reflective display using this liquid crystal display device, no scattering layer is provided on the top surface of the second polarizer 22, resulting in a mirror-like bright display. A linearly polarized light passing through the second polarizer 22 passes through the third polarizer 25 twice, thereby absorption occurs.

Reflection from the auxiliary light source 31 causes dissolution of polarization by the diffuser 33, and the light is partially absorbed by an absorption axis of the third polarizer 25. It is reflected again by a reflection axis of the second polarizer 22 into the third polarizer 25 side. Then, absorption occurs by the third polarizer 25 and only a linear polarized light component parallel to a transmission axis of the second polarizer 22 is reflected, returning to the observer's side again, which results in a desirable dark display.

In a case of a transmissive display to light on the fluorescent tube 32 of the auxiliary light source 31, the bright display has a color of the light source. The dark display is a mirror-like display in a reflective display.

By disposing a color film or a colored printed layer between the second polarizer 22 and the third polarizer 25, the contrast ratio can be improved by a mirror reflection (a bright display) and a color display (a dark display) in a case of a reflective display.

A Modified Example of Embodiments

In the embodiments explained above, the case of using a twisted nematic (TN) liquid crystal having the twist angle of 90° as a liquid crystal layer 15 of the liquid crystal cell is explained. However, in a case of using a liquid crystal cell, typically, such as a super twisted nematic (STN) liquid crystal having a twist angle of 180° to 260°, which controls birefringence, the function and effect by the present invention can be also available by disposing a retardation film or a phase compensating liquid crystal cell between the first polarizer 21 and the first substrate 2 or between the second substrate 5 and the second polarizer 22.

Besides, the case of using the fluorescent tube 32 for the auxiliary light source 31 is explained, but it is acceptable to use an electroluminescent (EL) device, a halogen light, or a metal halide light, etc.

The present invention can be applied not only to a transflective liquid crystal display device, but also to a transmissive liquid crystal display device.

INDUSTRIAL APPLICABILITY

As described above, in a liquid crystal display device according to the present invention, insufficiency of polarization degree in the visible light region and the in-plane unevenness of the polarization degree in the visible light region in the second polarizer is corrected, and the unevenness of display and unevenness of coloring in a case of a transmission display using an auxiliary light source can be reduced by disposing a third polarizer on the lower side of the liquid crystal cell between a second polarizer and an auxiliary light source.

Furthermore, in a case of a reflective display, since reflection from a reflection axis of a reflection-type polarizer is utilized by using a reflection-type polarizer as a second polarizer, no absorption by the polarizer arises and a display in bright can be realized, compared with a conventional case of using an absorption-type polarizer.

Still further, a thin, inexpensive liquid crystal display device without impairing portability can be provided.

What is claimed is:

1. A liquid crystal display device comprising:
   a liquid crystal cell formed by opposedly disposing a transparent first substrate and a transparent second substrate with a predetermined space therebetween, and filling a liquid crystal layer therein, which gives optical change to incident light by applying voltage on said liquid crystal cell;
   a first polarizer provided on the outside of said first substrate which is on a visible side of said liquid crystal cell;
   a second polarizer provided on the outside of said second substrate which is on an opposite side to the visible side of said liquid crystal cell; and
   an auxiliary light source provided on the opposite side of said second polarizer with respect to said liquid crystal cell,
   wherein a third polarizer to enhance the polarization degree when an emitted light from said auxiliary light source is emitted to the liquid crystal cell side as a polarized light through said second polarizer is provided between said second polarizer and said auxiliary light source,
   said first polarizer is an absorption-type polarizer in which one polarization axis is a transmission axis and another polarization axis intersecting to the transmission axis at nearly right angles is an absorption axis,
   said second polarizer is a reflection-type polarizer in which one polarization axis is a transmission axis and another polarization axis intersecting to the transmission axis at nearly right angles is a reflection axis, which is composed such that a plurality of complex layers formed by combining a layer having nearly equal refractive indices in a direction and in a direction orthogonal thereto, and a layer having different refractive indices in a direction and in a direction orthogonal thereto are laminated,
   said third polarizer is an absorption-type polarizer in which one polarization axis is a transmission axis and another polarization axis intersecting to the transmission axis at nearly right angles is an absorption axis or a reflection-type polarizer in which one polarization axis is a transmission axis and another polarization axis intersecting to the transmission axis at nearly right angles is a reflection axis, said first polarizer and said second polarizer are disposed such that the transmission axes thereof intersect at right angles, and said second polarizer and said third polarizer are disposed such that the transmission axes thereof form an angle from 0° to plus or minus 30°.

2. The liquid crystal display device according to claim 1, wherein said third polarizer is composed such that a plurality of either said reflection-type polarizer or said absorption-type polarizer, or both of them, are piled up.

3. The liquid crystal display device according to claim 2, wherein the transmission axis of each polarizer forming said third polarizer is disposed in a direction different from each other.

4. The liquid crystal display device according to claim 2, wherein a printed layer which transmits a part of light and absorbs the other light is provided between the plurality of polarizers composing said third polarizer.

5. The liquid crystal display device according to claim 2, wherein a space is provided between the plurality of polarizers composing said third polarizer.

6. The liquid crystal display device according to claim 2, wherein a printed layer which transmits a part of light and absorbs the other light and a space are provided between the plurality of polarizers composing said third polarizer.

7. The liquid crystal display device according to claim 1, further comprising a color filter in plural colors different in transmission intensity in a visible light region between the first polarizer and the second polarizer, wherein said auxiliary light source is a light source emitting light containing transmission wavelengths of the color filter in the plural colors, and light emitted from said auxiliary light source is rendered to be transmitted through said third polarizer and said second polarizer and transferred to said color filter as a linearly polarized light having little in-plane distribution of polarization degree and little difference of polarization degree in the visible light region.

8. The liquid crystal display device according to claim 1, further comprising a scattering layer to scatter light provided at least on one position out of, in a visible side of said first polarizer, between said first polarizer and said first substrate, and between said first substrate and said second substrate, wherein said scattering layer is a layer which transmits light with little phase difference and without changing the polarization degree between the incident light side and the emitted light side.

9. The liquid crystal display device according to claim 1, wherein a light attenuation layer which transmits a part of light and absorbs or diffuses the other light is provided between said second polarizer and said third polarizer or between said third polarizer and said auxiliary light source.

10. The liquid crystal display device according to claim 1, wherein a color filter or a colored printed layer is provided between said second polarizer and said third polarizer.

11. The liquid crystal display device according to claim 1, wherein an offset angle between the transmission axis of said second polarizer and a transmission axis of said third polarizer is in a range of 0° to 10°.

12. The liquid crystal display device according to claim 1, further comprising a retardation film being disposed between said second substrate and said second polarizer or between said second polarizer and said third polarizer.

13. The liquid crystal display device according to claim 1, wherein minute embossings are formed on opposing surfaces of said third polarizer and said auxiliary light source, respectively.

14. The liquid crystal display device according to claim 1, wherein said second polarizer and said third polarizer are fixed to each other with an adhesive layer.

15. The liquid crystal display device according to claim 1, further comprising a space provided between said third polarizer and said auxiliary light source.

16. The liquid crystal display device according to claim 1, further comprising a light attenuation layer to increase light absorption or light scattering provided on a surface of said auxiliary light source facing said third polarizer.

17. The liquid crystal display device according to claim 1, wherein said both of second polarizer and said third polarizer are reflection-type polarizer, a printed layer which transmits a part of light and absorbs the other light is provided on a surface of said second polarizer opposing said third polarizer, and a space is provided between the printed layer and said third polarizer.

18. The liquid crystal display device according to claim 17, wherein a retardation film is provided between said printed layer and said third polarizer.

19. The liquid crystal display device according to claim 17, wherein said printed layer has no polarization activity and no retardation.

20. The liquid crystal display device according to claim 17, wherein said printed layer contains white fluorescent pigment.

* * * * *

UNITED STATES PATENT AND TRADEMARK OFFICE
CERTIFICATE OF CORRECTION

PATENT NO. : 6,577,361 B1
DATED : June 10, 2003
INVENTOR(S) : Sekiguchi et al.

It is certified that error appears in the above-identified patent and that said Letters Patent is hereby corrected as shown below:

Drawings,
Change, "FIG. 1

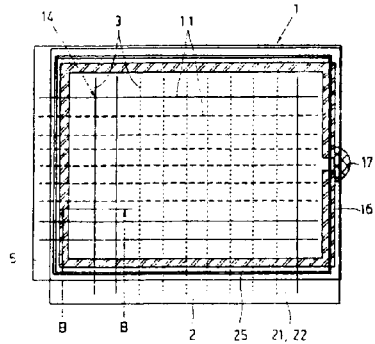

to be -- 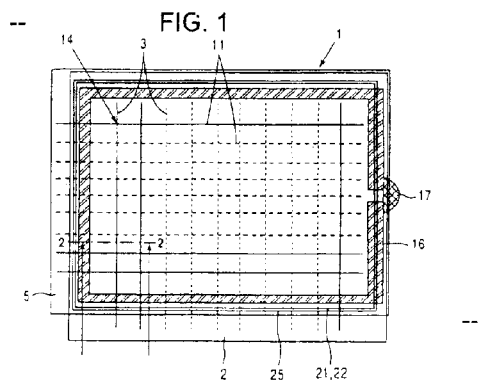 --

UNITED STATES PATENT AND TRADEMARK OFFICE
CERTIFICATE OF CORRECTION

PATENT NO. : 6,577,361 B1
DATED : June 10, 2003
INVENTOR(S) : Sekiguchi et al.

It is certified that error appears in the above-identified patent and that said Letters Patent is hereby corrected as shown below:

<u>Drawings cont'd,</u>
Change, "FIG. 17

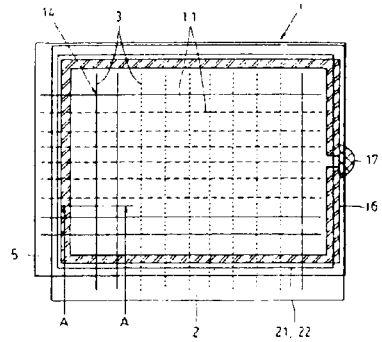

to be -- 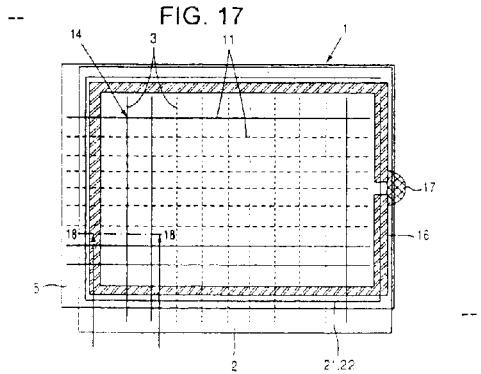

--

Signed and Sealed this

Seventeenth Day of February, 2004

JON W. DUDAS
*Acting Director of the United States Patent and Trademark Office*